United States Patent [19]

Gurd et al.

[11] Patent Number: 5,025,367
[45] Date of Patent: Jun. 18, 1991

[54] STORAGE ALLOCATION AND GARBAGE COLLECTION USING LIBERATE SPACE TOKENS

[75] Inventors: John R. Gurd, Manchester, United Kingdom; Katsura Kawakami, Kanagawaken, Japan

[73] Assignees: Victoria University of Manchester, Manchester, United Kingdom; Matsushita Electrical Industrial Co., Ltd., Osaka, Japan

[21] Appl. No.: 55,716

[22] Filed: May 28, 1987

[51] Int. Cl.$^5$ .................. G06F 9/312; G06F 12/02; G06F 12/12
[52] U.S. Cl. .................. 364/200; 364/241.8; 364/245.4; 364/246.3; 364/252.7; 364/222.82; 364/222.9; 364/283.1; 364/284.3; 364/957.1; 364/962.1; 364/970.2; 364/282.2
[58] Field of Search ... 364/200 MS File, 900 MS File

[56] References Cited

U.S. PATENT DOCUMENTS

| 4,121,286 | 10/1978 | Venton et al. | 364/200 |
| 4,638,424 | 1/1987 | Beglin et al. | 364/200 |
| 4,755,939 | 7/1988 | Watson | 364/200 |
| 4,757,438 | 7/1988 | Thatte et al. | 364/200 |
| 4,775,932 | 10/1988 | Oxley et al. | 364/200 |
| 4,864,495 | 9/1989 | Inaba | 364/200 |
| 4,912,629 | 3/1990 | Shuler, Jr. | 364/200 |

OTHER PUBLICATIONS

Honroritz et al., "Fundamentals of Data Structures", pp. 140-155.

*Primary Examiner*—Archie E. Williams, Jr.
*Assistant Examiner*—Ayni Mohamed
*Attorney, Agent, or Firm*—Spensley Horn Jubas & Lubitz

[57] ABSTRACT

A parallel storage allocation method and device in which each space in a memory section that is available for use is associated with a respective allocator and stores an identifier for the respective allocator, data identifying allocators not in use is stored, and a list of allocators associated with spaces which are available for use is maintained. Each time a memory space is no longer in use a check is made to determine the allocator identifier of any already free space which can be combined with the memory space that is no longer in use. A liberate space token is generated which includes a first identifier corresponding to an allocator which is not in use and a second identifier which corresponds to any already free space to be combined. If the list of allocators relative to available space does not contain the allocator having the second identifier, the allocator having the first identifier is entered in the list with details of the no longer in use space. If the list does not contain the allocator having the second identifier, the space that is no longer in use is combined with the space to which the second identifier relates and then the allocator having the first identifier is entered in the list with details of the combined space.

5 Claims, 30 Drawing Sheets

STORAGE ALLOCATION AND GARBAGE COLLECTION USING LIBERATE SPACE TOKENS

BACKGROUND OF THE INVENTION

1. Field of the Invention

The present invention relates to a method and device for parallel storage allocation in electronic computers.

2. Description of Related Art

In electronic computers such as microcomputers which incorporate a memory device, space in the memory which has been used must be made available for reuse in an efficient manner. FIG. 1a illustrates the relationship between a processing device and a memory device having the facility for controlling memory space usage.

Referring to FIG. 1a, a memory device 100 comprises a distribution (allocation) section 100a, a memory section 100b, a delay (defer) processing section 100c and a clear control section 100d. Communications channels 101 and 102 lead from processing device 103 to the memory device 100 and from the memory device 100 to the processing device 103 respectively.

The exchange of information between the operating device 103 and the memory device 100 is all done by the transmission of single data packets, hereinafter referred to as "tokens". When the distribution section 100a of the memory device 100 receives a memory space request token 104 it sends a start address for the space (which depends on the size of space required) in the form of a token 105. The memory section 100b can also receive a write token 106 or a read request token 107. In response to the former, the memory 100b enters the parameter V into address A, and in response to the latter reads the contents V of address A, and sends the result to the processing device 103 in the form of a data token 108. Except in the case of the write token WRT, a response to the processing device is necessary, and such responses are identified by parameters Ra. Tokens are not sent directly between the delay management section 100c or the clear control device 100d and the operating device 103. The delay management section 100c and the memory section 100b respectively perform the operations of handling read request tokens relating to data which has not yet arrived in the memory section and clearing memory space which the clear control device 100d has finished using. The different types of token can be recognized from a code in each token.

FIG. 1b illustrates schematic examples of each kind of token. Referring to FIG. 1b, each token comprises four fields, namely a code field 451, a second field 452, a third field 453, and a fourth field 454.

The code field 451 is the one used to distinguish between different kinds of token. In the example of FIG. 1 it is allotted four bits, from which can be represented sixteen different kinds of token. For the sake of simplicity, the illustrated fields 452 to 454 each comprise 24 bits, but any length can be selected to suit a particular system. Shaded areas in the diagrams are fields which are not used.

FIGS. 2a to 2c illustrate in detail the functions of the above-mentioned distribution section 100a and memory section 100b. The distribution section 100a seeks and reserves memory space (hereinafter referred to as "space") which is not in use to meet the requirements of the processing device 103. Then it sends a pointer token which identifies the reserved space to the processing device 103. Referring to FIG. 2a, channels 201 and 202 carry tokens from and to the processing device 103 respectively, and correspond to the parts labelled 101, 102 in FIG. 1a. A distribution table 220 comprises the following items: a valid flag 221, a size field 222, and a start address field 223. When the valid flag 221 is 1 this means that the space to which the associated fields 222 and 223 relate is not in use, that is "free". The size field 222 and start address field 223 contain the size and start address of the free space.

The status address of each space in memory section 100b and the last address of the space comprise a free flag 224 and a size flag 225. When the free flag 224 is "1", this means its space is not in use; size flag 225 holds the same contents as the size field of the distribution table 220.

A space request token SRQ 203 which is sent from the processing device 103 to the distribution device 100a includes the two parameters Zr, the size of the space required, and Ra. The workings of this system will now be described in greater detail.

(1) Referring to FIG. 2a, when the space request token 203 (SRQ) arrives, the distribution section 100a checks the distribution table 220 and searches for an address which stores a value as large as the value for the parameter Zr of the space request token SRQ 203. If such an address is found, the parameter Ra of the space request and the start address of the related space are associated. For example, as shown in FIG. 2b, the address related to space N may be located, and if so a pointer token (PNT) 204 is generated.

At the same time, "0" is entered in the valid flag of the corresponding address in the distribution table 220. Entering "0" in the valid flag 221 for space N indicates that the space N is now in use.

When not enough space can be found to fulfill the space requests of the distribution section 100a, an overflow occurs which has a characteristic control signal, and the processing device 103 is notified that the program cannot progress any further. Since this does not have any direct bearing on the present invention, it will not be discussed in detail herein.

When a space (M, for example) in the memory device 100b was being used but is no longer in use, the memory device 100b detects this condition. If the space next to the space M is free, then the said space next to M and M are considered as a single combined space and recorded as such in the table 220. If there is no free space adjacent to space M, M alone is recorded in the table 220. FIG. 2b illustrates the processes which occur when use of the space M is finished (i.e. when the space M has become free).

(2) The memory section 100b investigates the free flag of addresses adjacent, to space M, namely address (SM−1) and address (SM+ZM). (SM+ZM=SN). Since the valid flag of the address SN is "0", nothing is done with respect to the space N which is in use. Since the valid flag of the address SM−1 is "1", it is known that the space L is free. The start address SL of the space L is calculated from the size field (SL=SM−ZL). The start address SL of the space formed from the joining together of the space L and the space N, and its size (ZL+ZM) are calculated.

(3) The distribution section 100a and the distribution table 220 are checked, and the address holding the value SL in the start address field is sought, and referring to FIG. 2c, the value ZL+ZM is entered in the size field of this address.

When free spaces have not been joined together by the action of the memory section 100b (as explained in (2) above), the address which holds the start address (SM) of the space to be registered is not present in the distribution table 200. Accordingly the start address SM and the size ZM are entered into an address in which the valid flag is "0", and the valid flag is changed to "1".

In the above system, when a memory block is no longer in use, it is not possible to inform the distribution table directly and then re-write the start address of the space and the last address at the same time. This has the disadvantage that tokens are processed too slowly. Furthermore, when the above-mentioned two processes are carried out in accordance with the procedure described above, logical contradictions arise. This problem will now be explained with reference to FIGS. 3 and 4a to 4h.

FIG. 3 shows a system wherein the distribution section 100a and the memory section 100b are separated, and communication between them is carried out entirely by means of tokens. The word "separated" hereinafter means communicating completely by means of sending tokens.

In FIG. 3, token channels 306 and 307 connect the distribution section 100a and the memory section 100b. The channels carry a space request token (RSV) 308 and a liberate space token (LIB) 309. The space request token results from the distribution section 100a seeking to turn free space into space in use, and the liberate space token (LIB) 309 results from free space becoming available which must be recorded in the distribution table. The problems of this system are explained with reference to FIGS. 4a to 4h. FIG. 4a shows the same kind of situation as FIG. 2a, and a space request token (SRQ) 303 is being sent from the processing device 103. In the memory, spaces L and N are free, and space M is in use. The process will be explained below:

(1)

When the space request token SRQ (303) arrives, the distribution section 100a checks to see if there is enough free space to satisfy the request. Assuming the space N can accommodate Zr (the requested space) space N is looked up in the distribution table. The distribution section 100a reads the advance address SN and size ZN from the distribution table, joins to these the parameter Ra of the space request token, and referring to FIG. 4b, sends the result to the processing device 103 as a pointer token 404. At the same time, a reserve space token (RSV) 408 which includes SN and ZN as parameters is sent to the memory section 100b. Then the valid flag of the address in the distribution table corresponding to the space N is changed to "0".

(2)

When the memory section 100b receives the reserve space token 408 (RSV), "0" is entered in the free flags of the first and last addresses of the space N, and this indicates that the space N is in use. The addresses SN and (SN+ZN−1) of the first and last words respectively are calculated from the parameters of the reserve space token RSV 408. The results of this are as shown in FIG. 4c.

When use of a memory space is completed, the memory section 100b detects this and changes the valid flag of the space to "1". The distribution table also requires updating. FIG. 4d illustrates the case in which the space M is no longer in use.

(3)

When the memory section 100b detects that the space M is no longer in use, it enters "1" into the valid flags in the first and last addresses of space M. Next, in order to determine whether the neighboring spaces are free or not, it reads the addresses adjacent to M, namely (SM−1) and (SM+ZM). As a result of this it is known that the space L is free. From this the start address and size of the space formed by combining L and M and the parameters (SL and ZL+ZM in FIG. 4d) are sent to the distribution device 100a in the form of a liberate space token (LIB) 409.

Referring to FIG. 4d, consider the situation in which at this point a new space request token 410 has arrived from the processing device 103.

In the case where the liberate space token arrives before the space request token:

(3')

When the distribution section 100a receives a liberate space token 409, it extracts its address parameter SL, and searches for the address in the distribution table which holds the parameter SL as a start address. Referring to FIG. 4d, the result is that the address 430 is located in the distribution table, and a new space size (ZL+ZM) is entered in it. The resulting distribution table is as shown in FIG. 4e.

The above liberate space process is completed without contradictions, but if in the same situation as is illustrated in FIG. 4d the space request token 410 arrives before the liberate space token 409, contradictions do arise. This is explained as follows:

(4)

When the space request token 410 arrives, the distribution section 100a seeks free space and locates space L for example. As a result of this, referring to FIG. 4f, a pointer token 411 and a space request token 412 are generated, and at the same time a "0" is entered into the valid flag of the corresponding address 430.

(5)

When the liberate space token 409 subsequently reaches the distribution section 100a, it seeks an address with the start address SL in the distribution table. No such address is found since the valid flag of address 430 is "0", and therefore as shown in FIG. 4g the start address SL and size (ZL+ZM) are entered into the table as a new space. A space request token 412 (shown in FIG. 4f) arrives at the memory section 100b, and as a result the memory section 100b enters "0" into the valid flag of the space which starts with the address SL.

The form of tokens RSV 408 of FIGS. 4b, 4d and 4f and the token LIB 409 are shown in FIG. 4h. In the same FIGS. 491 to 494 correspond to 451 to 454 of FIG. 1b.

Referring to FIG. 4g, the address 430 indicates that the space with start address SL and size (ZL+ZM) is free, even though that space is in use, and the contents of the distribution section and those of the memory section therefore do not agree. The root of this problem is that there is a time interval between the time that the space M is no longer in use and the memory section 100b has joined adjacent spaces, and the time at which the results of this are entered into the distribution table, and a space request process has been initiated during this time interval. In order to avoid this, it is necessary to establish a special signal line between the memory section 100b and the distribution section 100a and to prevent a space request being effected in the above-mentioned time. When memory space becomes free, it is essential to determine whether or not there is a corresponding store address in the distribution table, and that takes time.

Referring to FIG. 5, if several distribution sections 100a, 100a' are processed in parallel in an attempt to disperse the load of the distribution process, it is necessary to search the entire distribution table and control is very complicated.

It is an object of the present invention to obviate or mitigate the above disadvantages.

SUMMARY OF THE INVENTION

According to the present invention, there is provided a parallel storage allocation method in which a distribution section including a series of allocators controls the allocation of memory spaces in a memory section, wherein each memory space which is available for use is associated with a respective allocator and stores an identifier for the respective allocator, data identifying allocators not in use is stored, a list of allocators associated with spaces which are available for use is stored, a check is made each time a memory space is no longer in use to determine the allocator identifier of any space which is available for use and can be combined with the memory space which is no longer in use, a liberate space data is generated when a space is no longer in use, the liberate space data including a first identifier which is the identifier of an allocator selected from the allocators not in use and a second identifier which is the identifier of the allocator related to any space which can be combined with the space which is no longer in use, the distribution section reviews the second identifier and looks in the said list for the allocator associated with the second identifier and, if the list does not contain the associated allocator, enters the allocator associated with the first identifier in the list with appropriate space identifying data to indicate that the space which was in use is now available for use, but, if the list does contain the associated allocator, generates combine space data which results firstly in the spaces being combined and secondly in the allocator associated with the first identifier being entered in the list with space identifying data appropriate to the combined space.

The present invention also provides a parallel storage allocation device having a distribution section including a series of allocators, and a memory section in which the allocation of memory spaces is controlled by the distribution section, the device comprising means for storing in each memory space which is available for use a respective allocator identifier, means for storing data identifying allocators not in use, means for storing a list of allocators associated with spaces which are available for use, means for detecting when a memory space is no longer in use, means for determining the allocator identifier of any space which is available for use and can be combined with a detected memory space which is no longer in use, means for generating liberate space data related to a detected memory space which is no longer in use, the liberate space data comprising a first identifier which is the identifier of an allocator selected from the allocators not in use and a second identifier which is the identifier of the allocator related to any space which can be combined with the space which is no longer in use, means for searching the said stored list for the second identifier, means for entering the allocator associated with the first identifier in the list with appropriate space identifying data if the second identifier is not found in the searched list, means for generating combine space data if the second identifier is not found in the searched list, means responsive to the combine space data firstly to combine the spaces related to the first and second identifiers and secondly to enter the allocator associated with the first identifier in the said list with space identifying data appropriate to the combined list.

BRIEF DESCRIPTION OF THE DRAWINGS

The present invention will now be described, by way of example, with reference to the accompanying drawings, in which:

FIG. 1b is a schematic diagram of the form of tokens used in the device of FIG. 1a;

FIG. 3 is a simple illustration of separate distribution and memory sections and communications therebetween;

FIGS. 4a to 4h illustrate token exchanges between the distribution section and memory section of FIG. 3;

FIG. 4a illustrates conditions before receipt of an SRQ;

FIG. 4b shows the generation of PNT and RSV tokens in response to receipt of an SRQ;

FIG. 4c illustrates the generation of a further SRQ and a LIB token;

FIG. 4e illustrates the case in which an LIB signal has been processes in the distribution section before receipt of the further SRQ;

FIG. 4f illustrates the case of an LIB being received after the further SRQ;

FIG. 4g illustrates a problem that can arise with a known system; and

FIG. 4h illustrates the token structure.

FIGS. 8a to 8h illustrate the operation of the device of FIGS. 6 and 7;

DESCRIPTION OF THE PREFERRED EMBODIMENT

FIGS. 9a to 9e illustrate a further embodiment of the present invention.

When the spaces L and M have been combined into a single free space

Figure 1A:
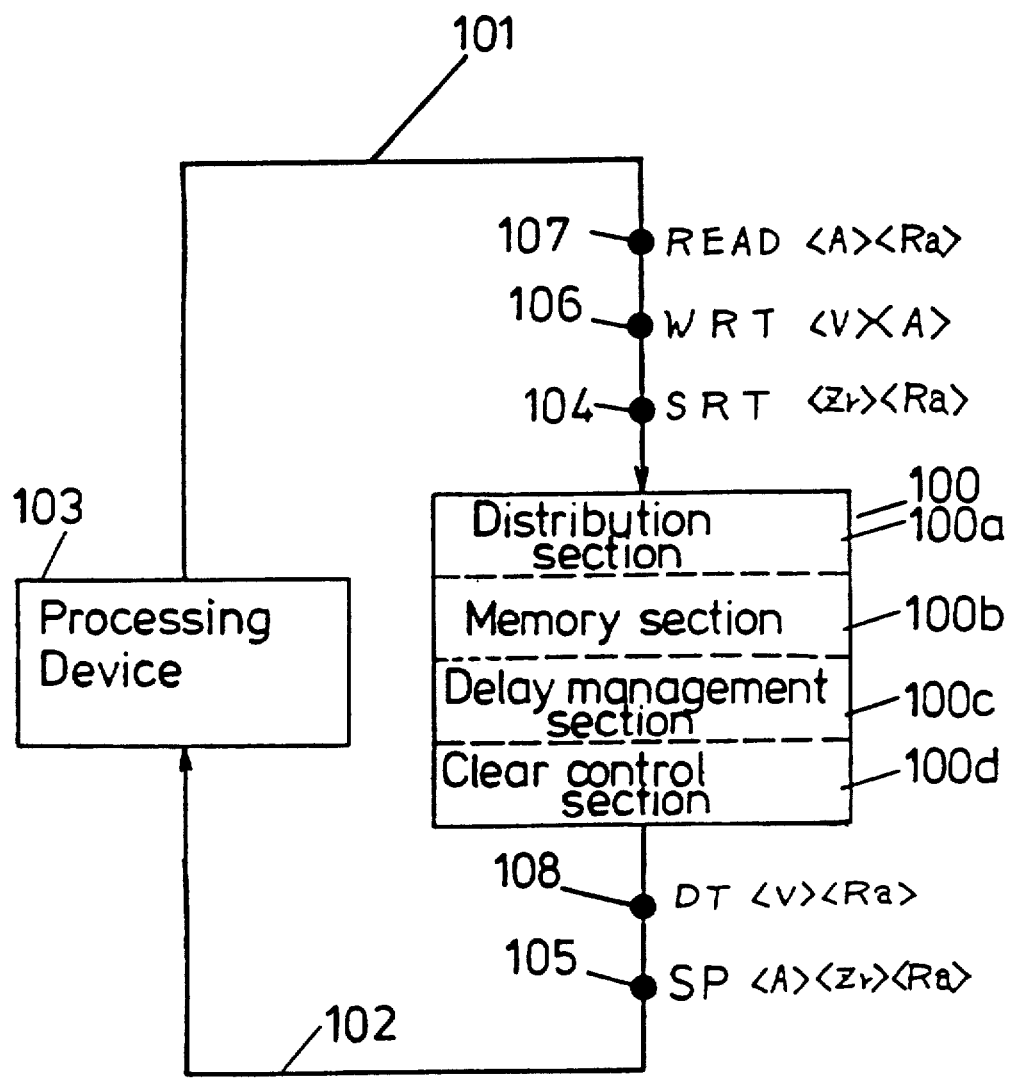
FIG. 1a is a block diagram of a prior art distribution processing device.
Figure 6:
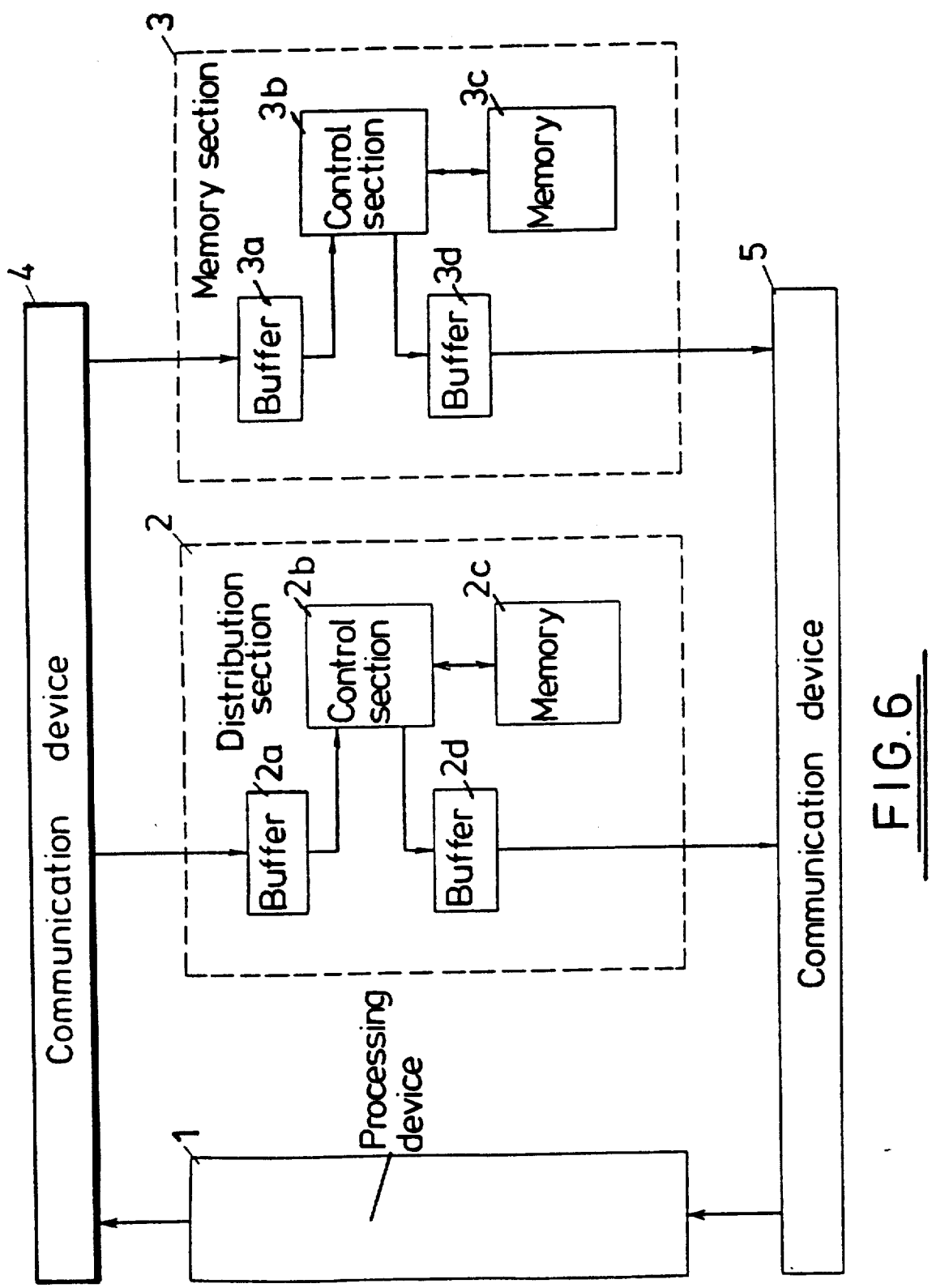
FIG. 6 is a schematic diagram of a memory distribution device in accordance with the present invention.

Referring to FIG. 6, numeral 1 is a processing device which corresponds to the processing device 103 in FIG. 1a. Numerals 2 and 3 identify a distribution section and a memory section respectively, which correspond to the distribution section 100a and the memory section 100b in FIG. 1a respectively. Numerals 4 and 5 identify communication devices which transfer tokens between the processing device 1 and the distribution section 2 and the memory section 3, and correspond to the channels 101 and 102 in FIG. 1a respectively.

In the distribution section 2, a buffer 2a temporarily stores tokens which are being sent from the communication section 4. Numeral 2b identifies a control section which determines the kind of token being entered and, depending on the kind, either stores the parameters of the token in memory 2c, or reads the contents of the memory 2c. Numeral 2d identifies a buffer the purpose of which is to transfer tokens from the control section 2b to the communication device 5.

In the memory section 3, numeral 3a identifies a buffer which temporarily stores tokens which have been sent from the communications device 4. Numeral 3b identifies a control section which determines the type of token being entered and, depending on the type, either stores the parameters of the token in a memory 3c or reads the contents of the memory 3c. Numeral 3d identifies a buffer the purpose of which is to transfer tokens which have been sent from the control section 3d to the communication device 5.

Figure 3:
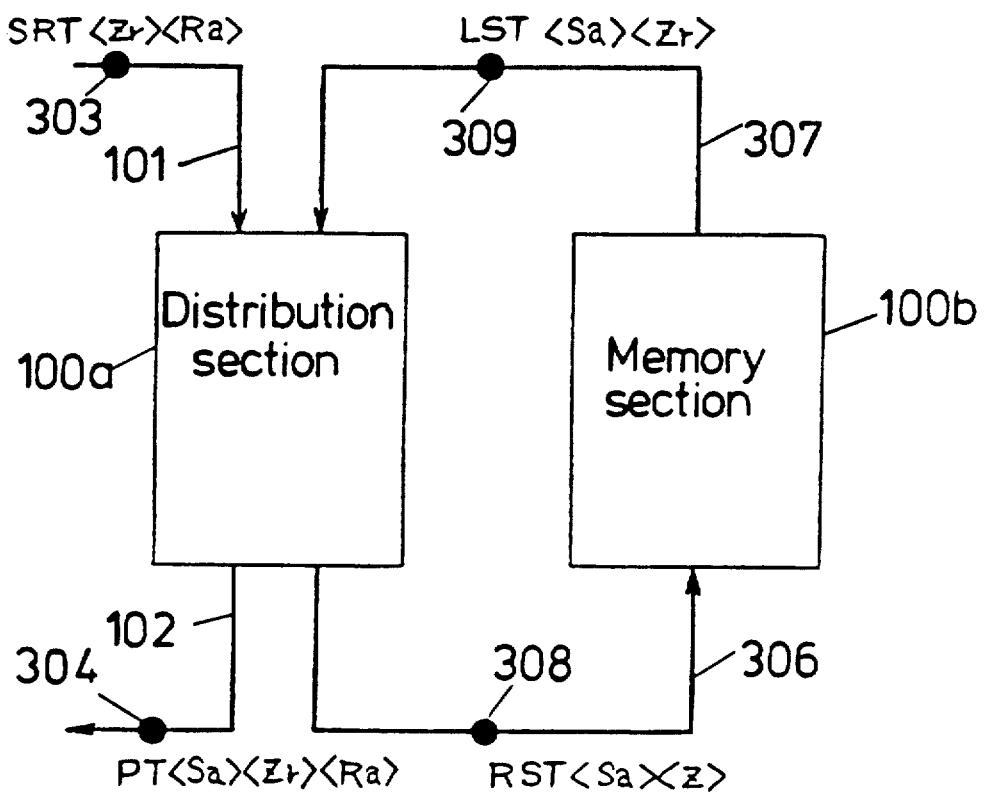
Figure 4A:
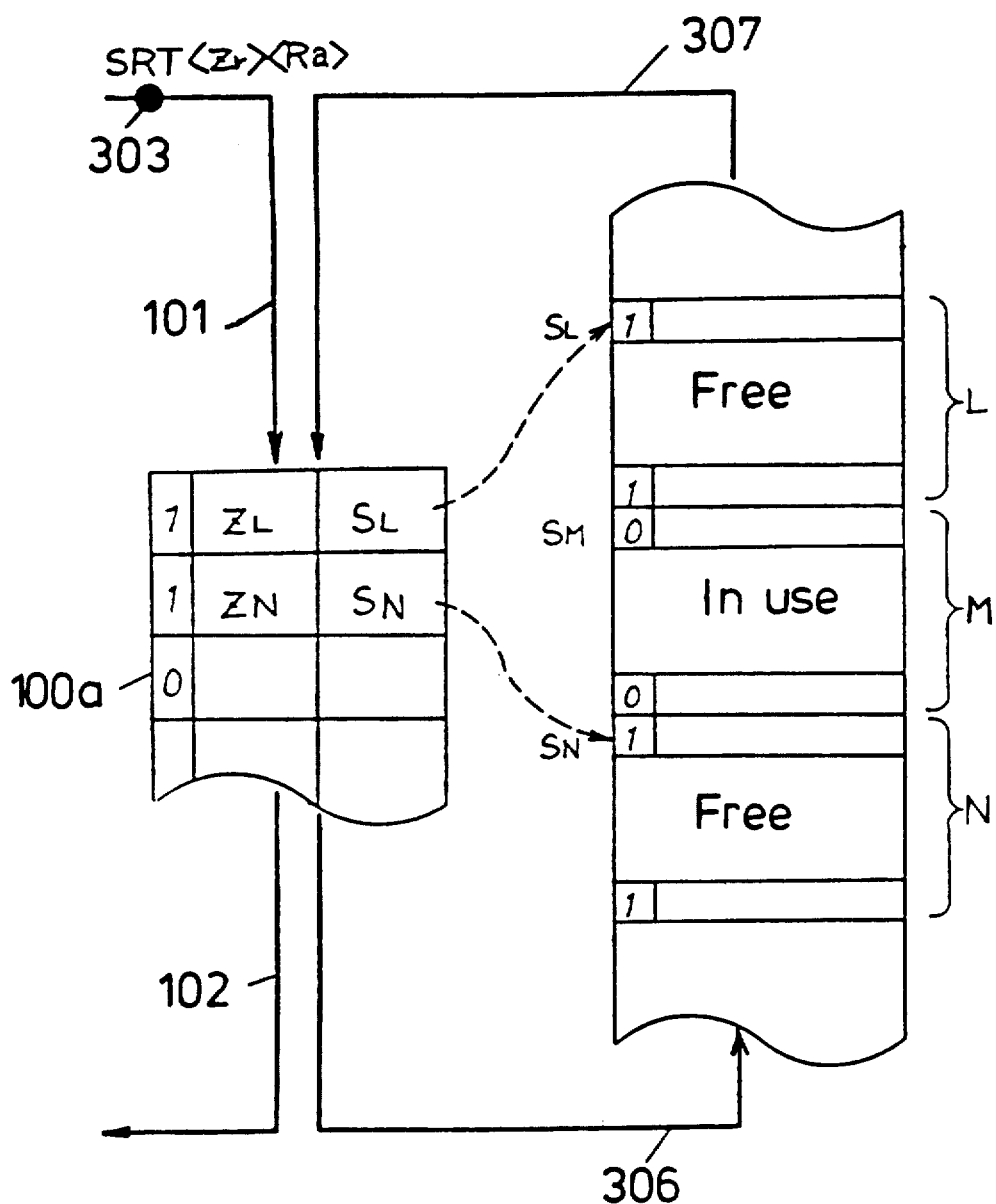
Figure 4B:
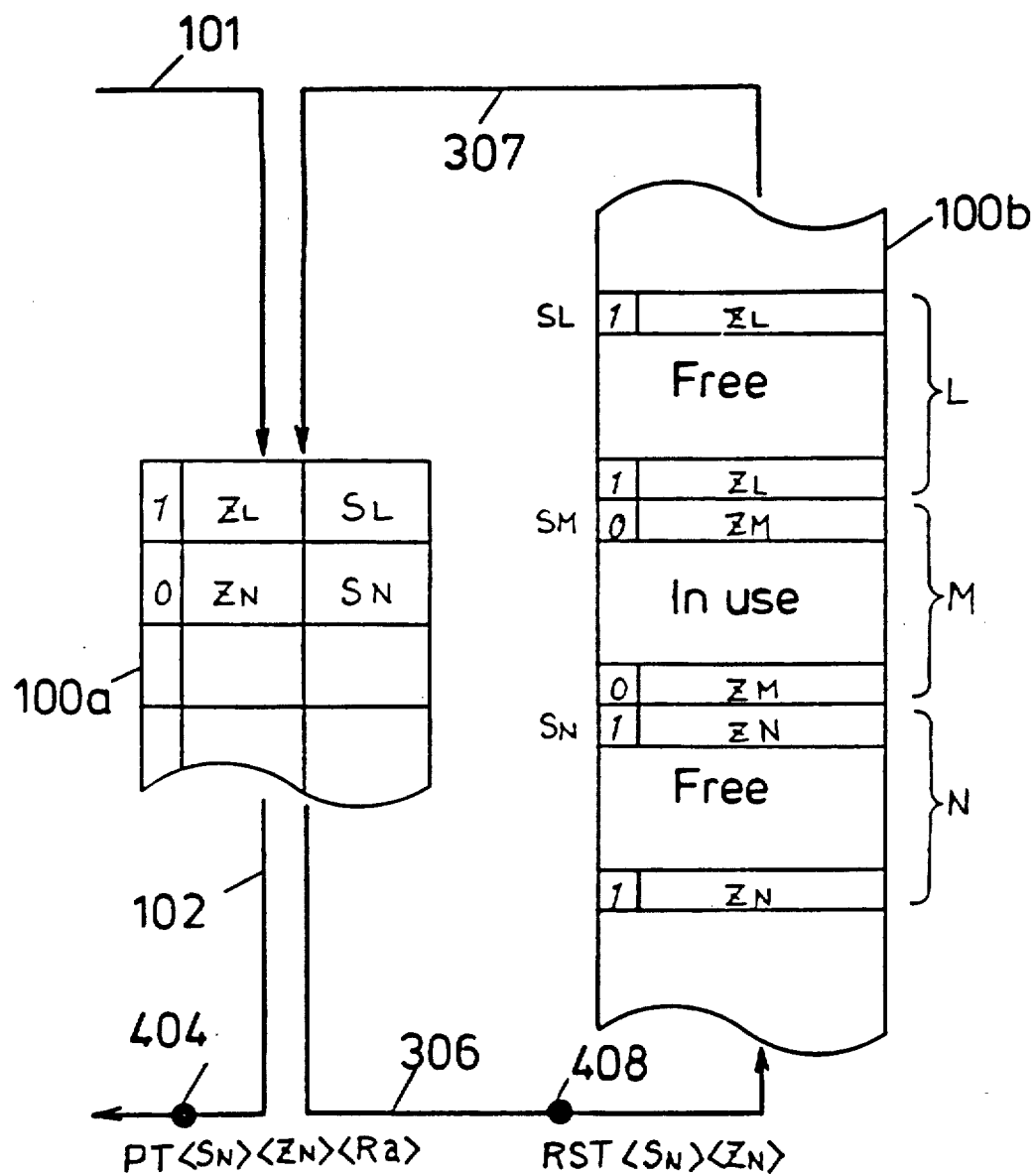
Figure 4C:
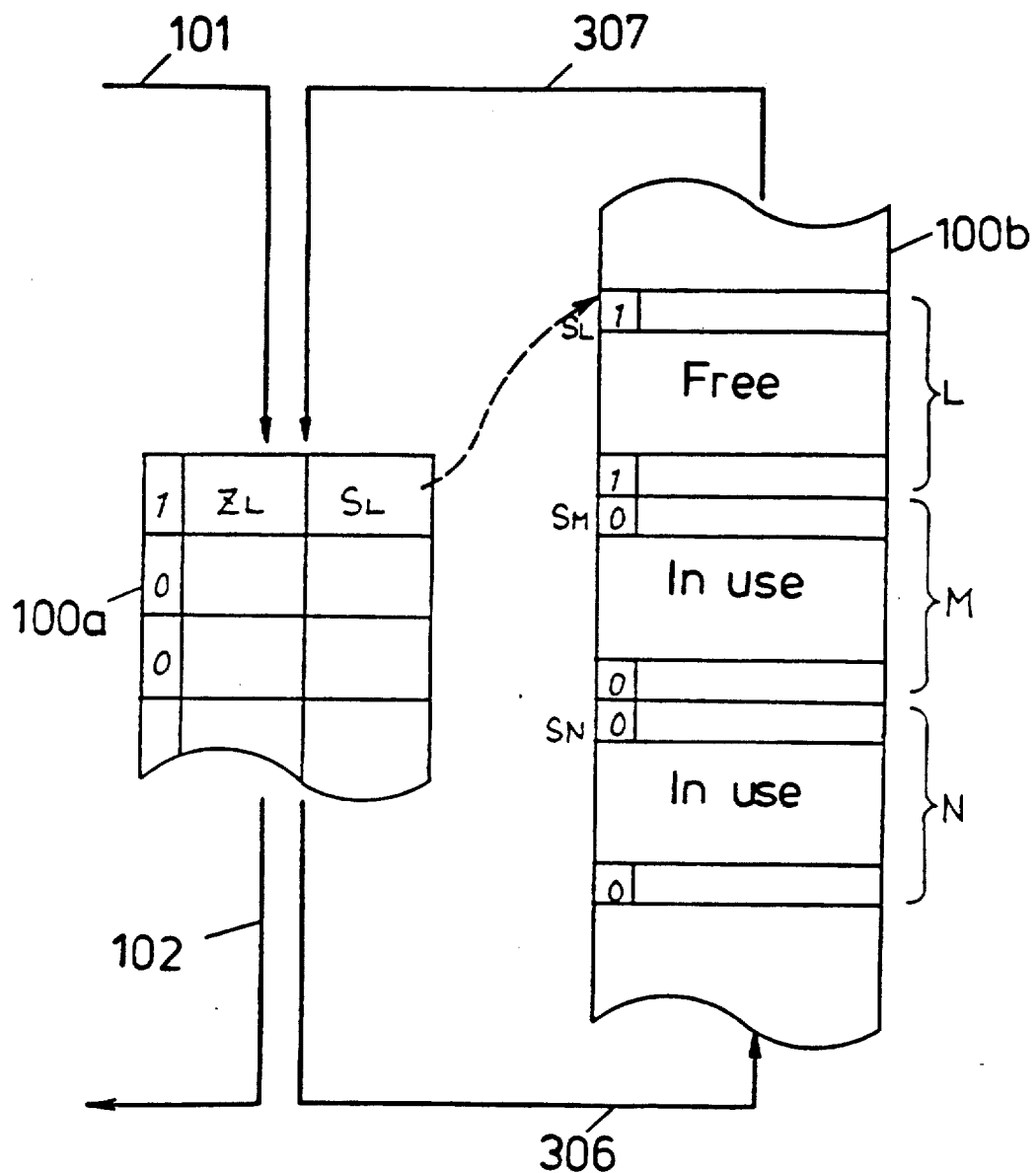
Figure 4D:
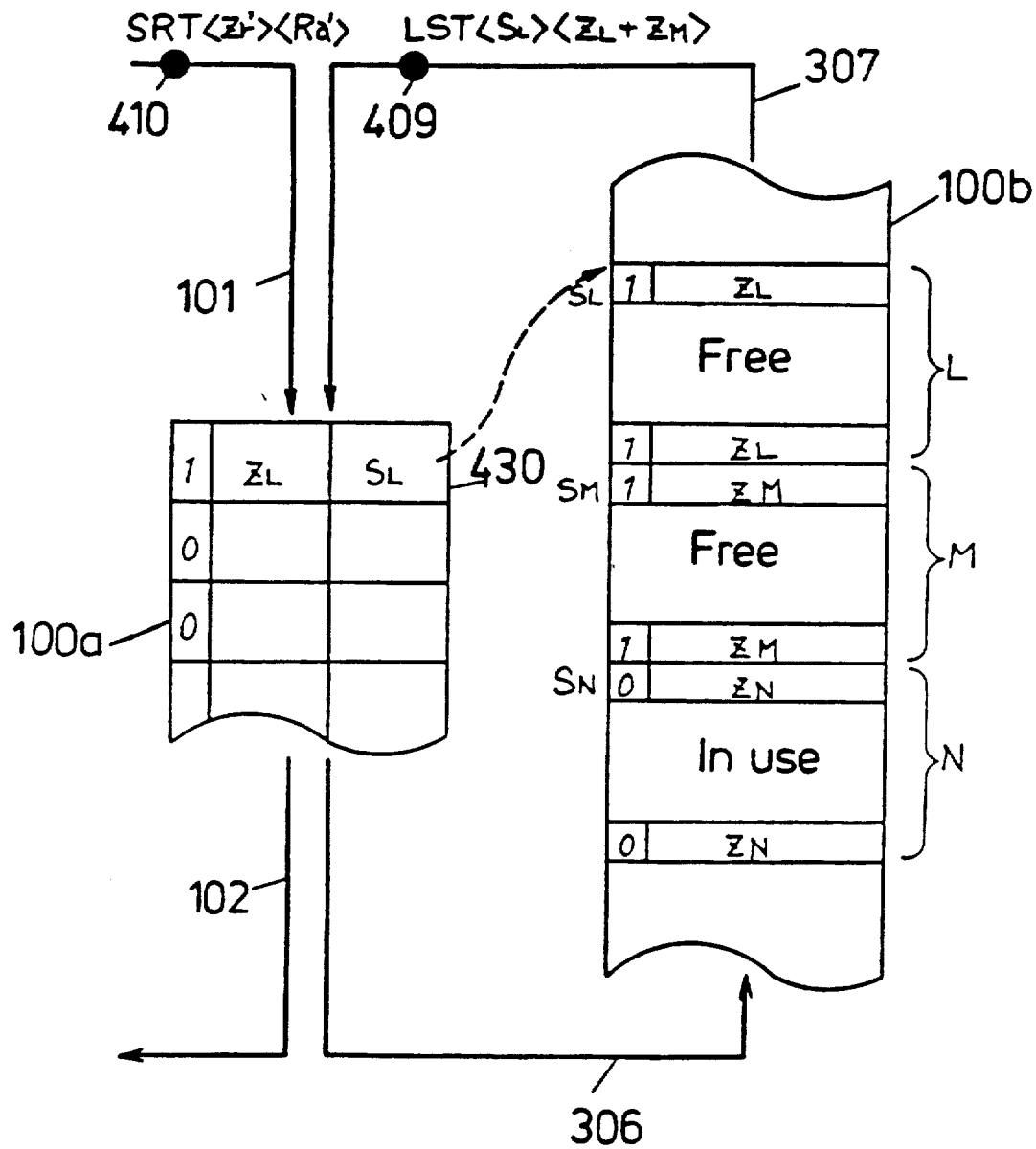
Figure 4E:
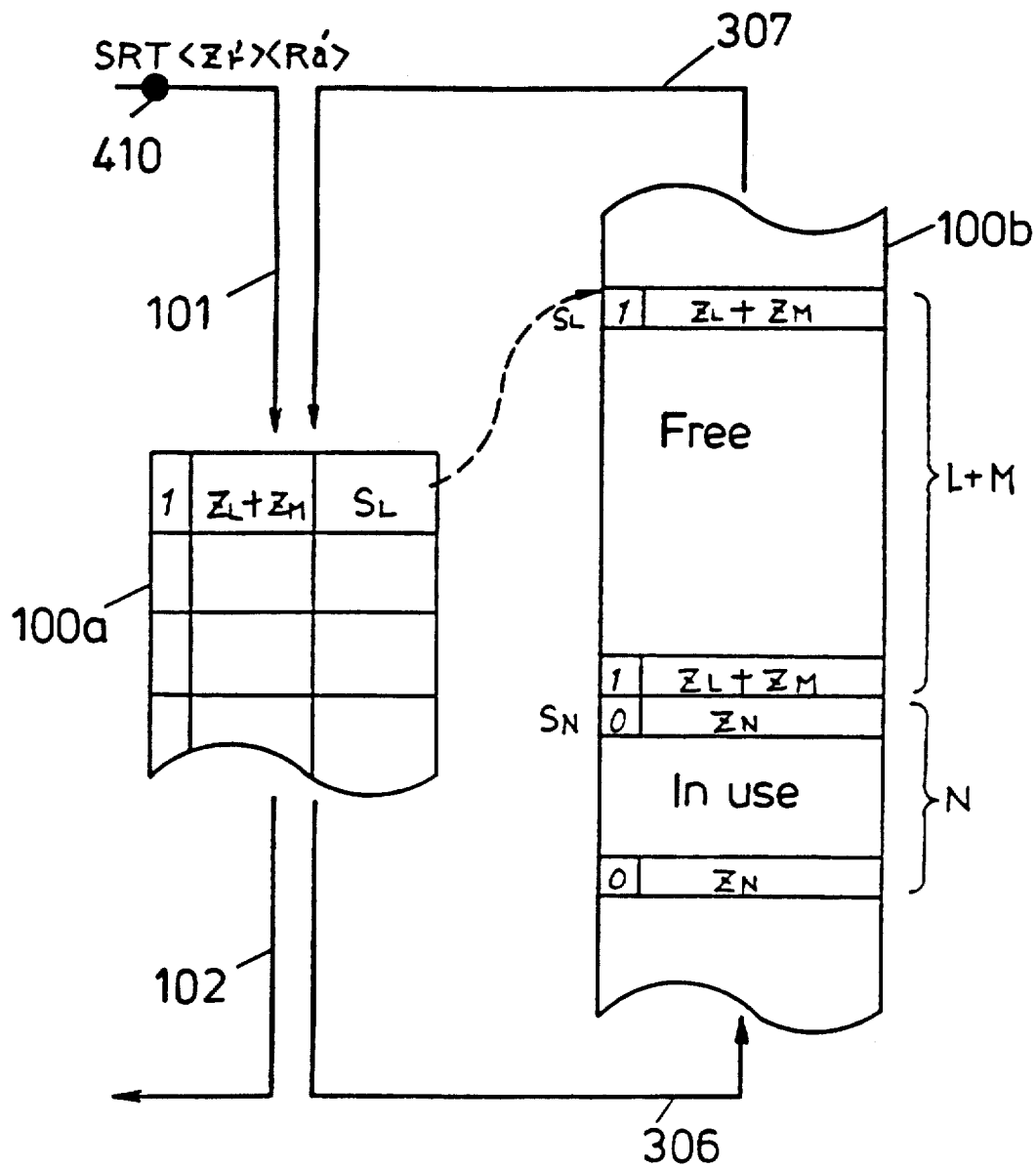
Figure 4F:
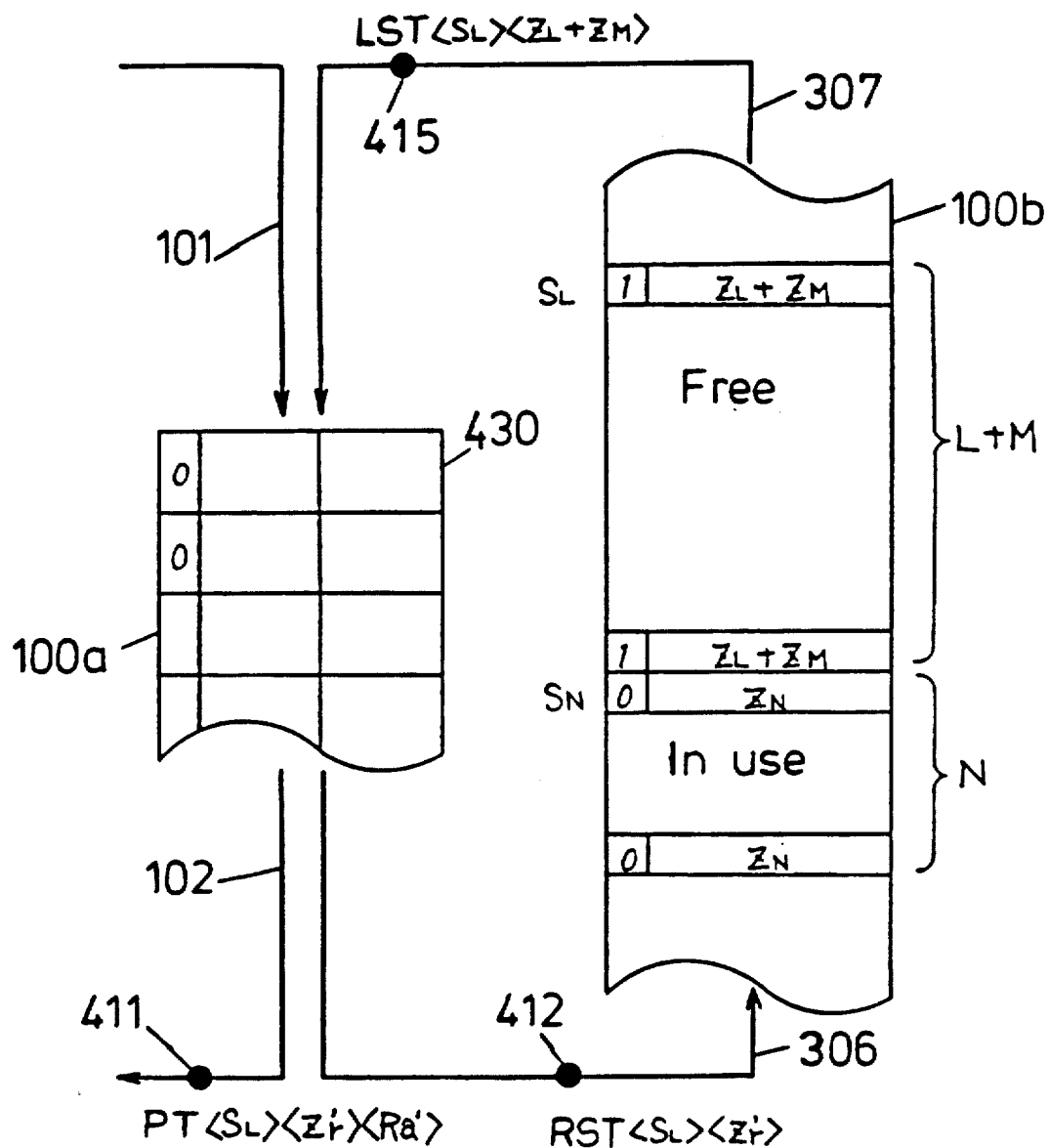
Figure 4G:
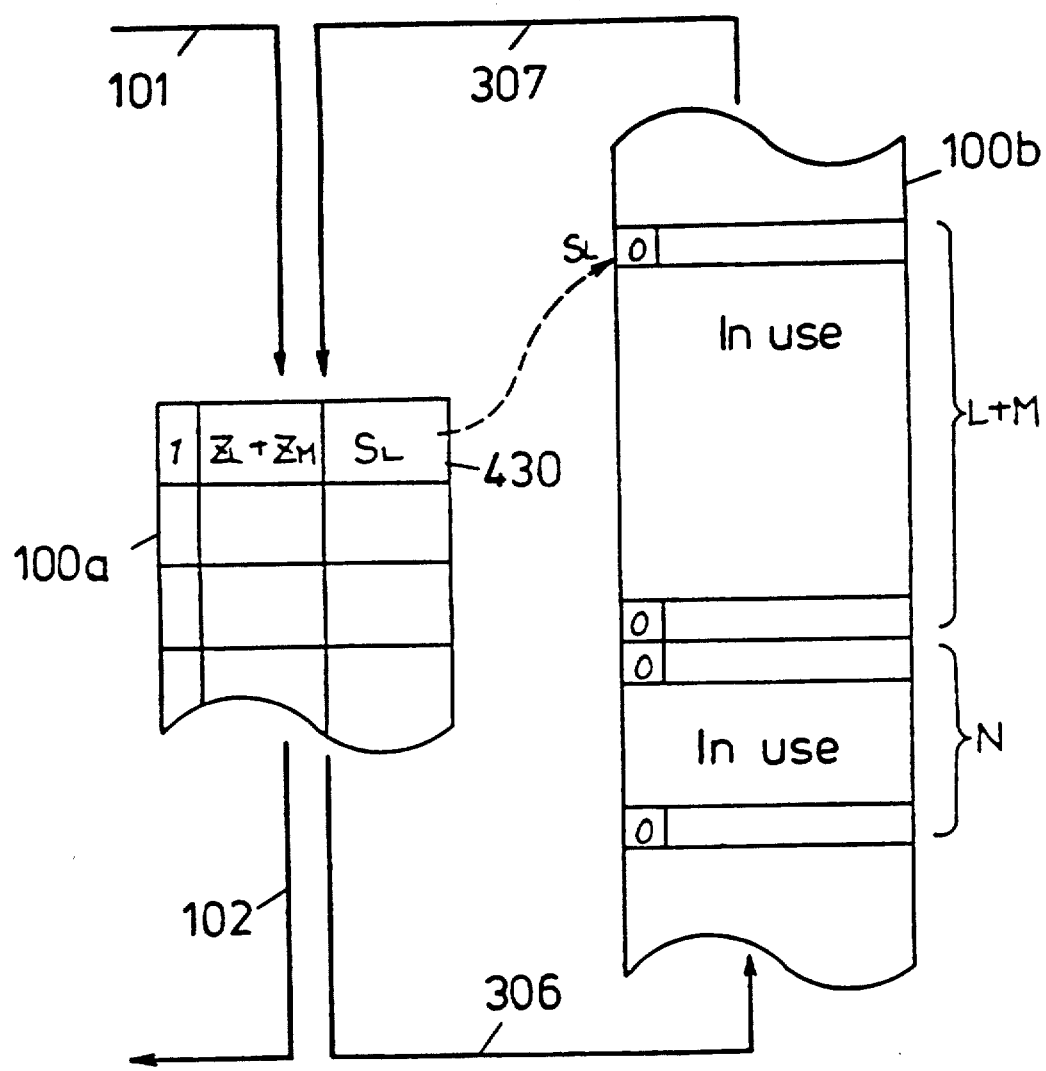
Figure 4H:
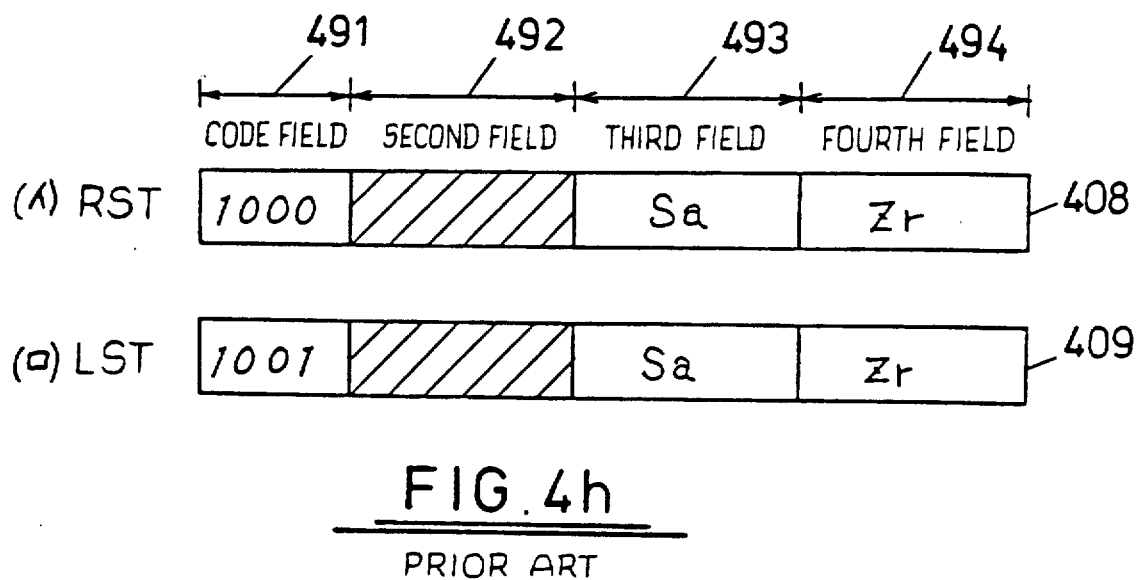
Figure 5:
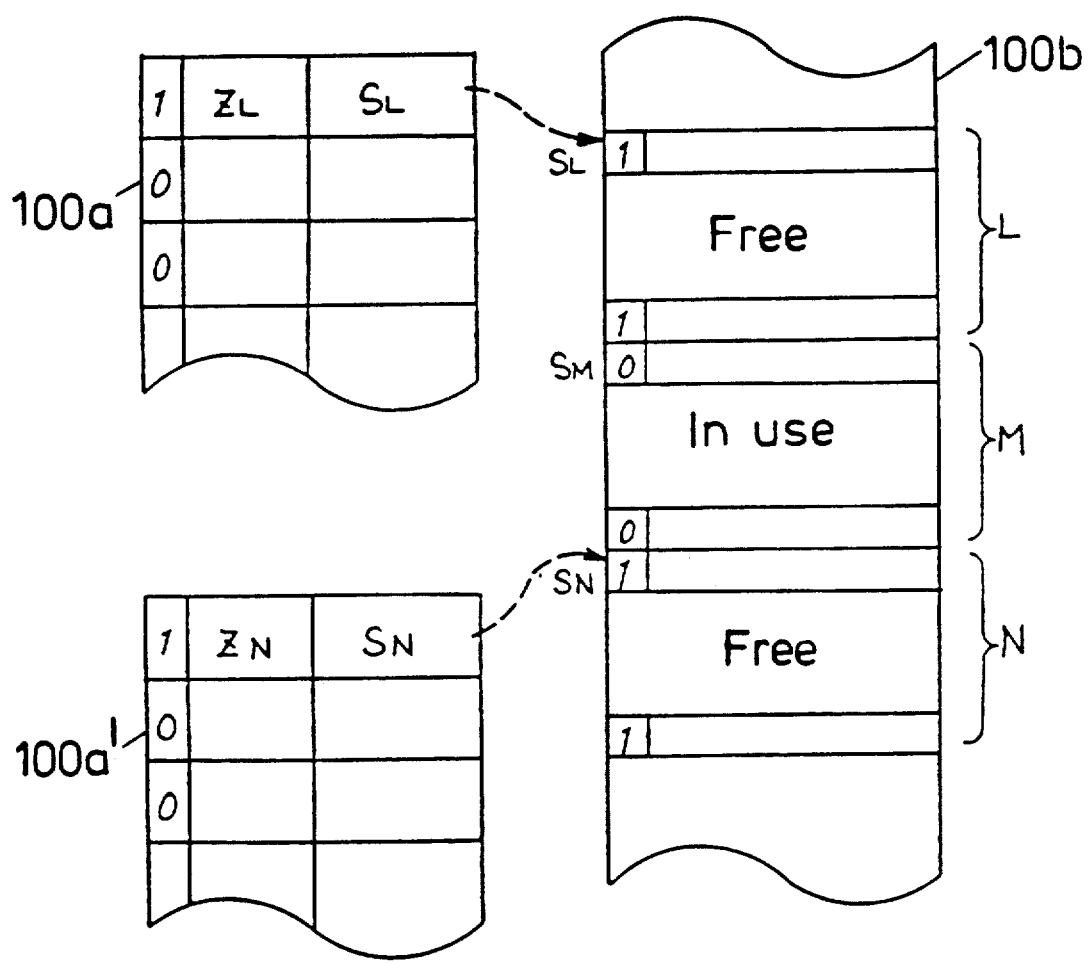
Figure 7:
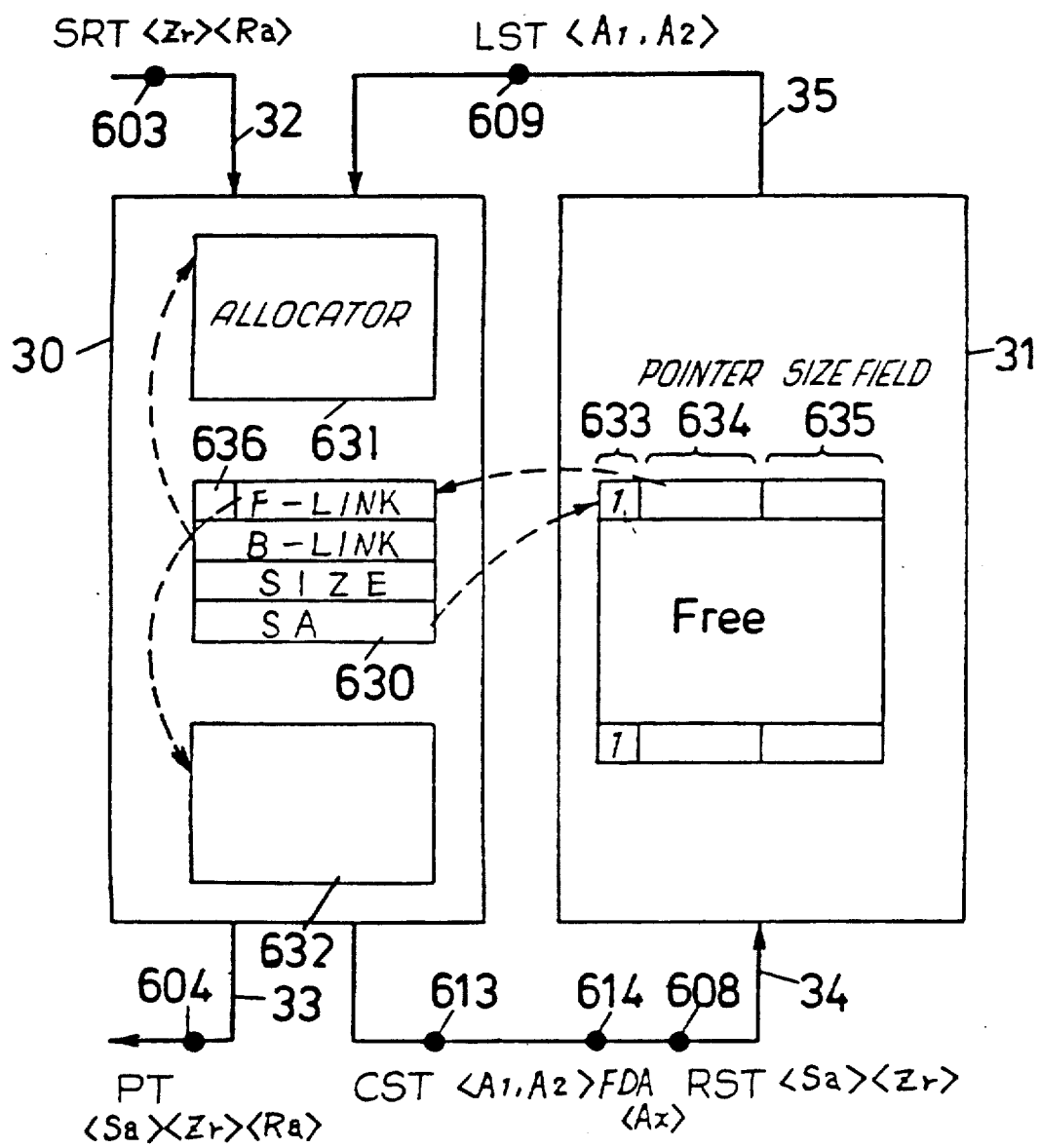
FIG. 7 is a schematic diagram of components of the device of FIG. 6.

Referring to FIG. 7, the construction of the memories 2c and 3c in the distribution section 2 and the memory section 3 respectively will be explained. In FIG. 7, numeral 30 identifies a memory space in the memory 2c of the distribution section 2, and numeral 31 identifies the memory space in the memory 3c of the memory section 3. Numerals 32, 33, 34 and 35 are the channels along which tokens are sent and received, and correspond to the communication devices 4 and 5 in FIG. 6. Numeral 603 identifies a space request token, numeral 604 identifies a pointer token, numeral 608 identifies a reserve space token, numeral 609 identifies a liberate space token, and these correspond to the tokens 303, 304, 308 and 309 respectively from FIG. 3. Numeral 613 identifies a combine space token (CMB), numeral 614 identifies a free allocator token (FDA). Numerals 630 to 632 identify allocators, and one of the allocators corresponds to the free space in the memory section 3 of FIG. 6. The allocators 630 to 632 form a double chain series which consists of the four words, F-link, B-link, size and start address. F-link and B-link indicate the next allocator in the series and the previous allocator in the series respectively. The size and start address relate to the corresponding free spaces. Numeral 636 identifies the valid flag which indicates when the allocator corresponds to a free space. The first and last addresses of the free space within the memory 31 contains the related distribution information. The first or start address comprises a valid flag 633, an allocator pointer 634, and a size field 635, but the last word only has the valid flag and the size field. The valid flag 633 is "1" when the space is free and "0" when the space is in use. The allocator pointer 634 holds the address within the distribution section 2 of the allocator which relates to the space. In a space which is in use, there are only the valid flag 633 and the size field 635 of the beginning address and last address.

An example of the method of memory space distribution in accord with the present invention will be explained. FIGS. 6 and 7 show only one example of a detailed construction in accordance with the present invention. For example the present invention need not be limited to the buffers 2a and 2d and the control section 2b in the distribution section. The basic operation of this example of the present invention can best be understood from FIGS. 8a to 8f.

(a) When a space request token 603 arrives, the distribution section 2 scans the allocator series and seeks a free space of appropriate size. For example, on discovering the space N, the distribution section 2 reads its start address SN and size ZN from within the corresponding allocator A2, adds the parameter Ra of the space request token, and referring to FIG. 8b, sends this to the processing device 103 as a pointer token 604. At the same time it sends a reserve space token 608 to the memory section 3. The allocator A2 which corresponds to the space N is taken from the series of allocators, and becomes a free allocator.

(b) When the memory section 3 receives the reserve space token 608, "0" is entered into the free flag of the first and last addresses of the space, and this indicates that this space is now in use. The first address SN and the last address (SN+ZN−1) are calculated from the parameters of the reserve space token 608 and as a result the memory space is as in FIG. 8c.

Figure 8A:
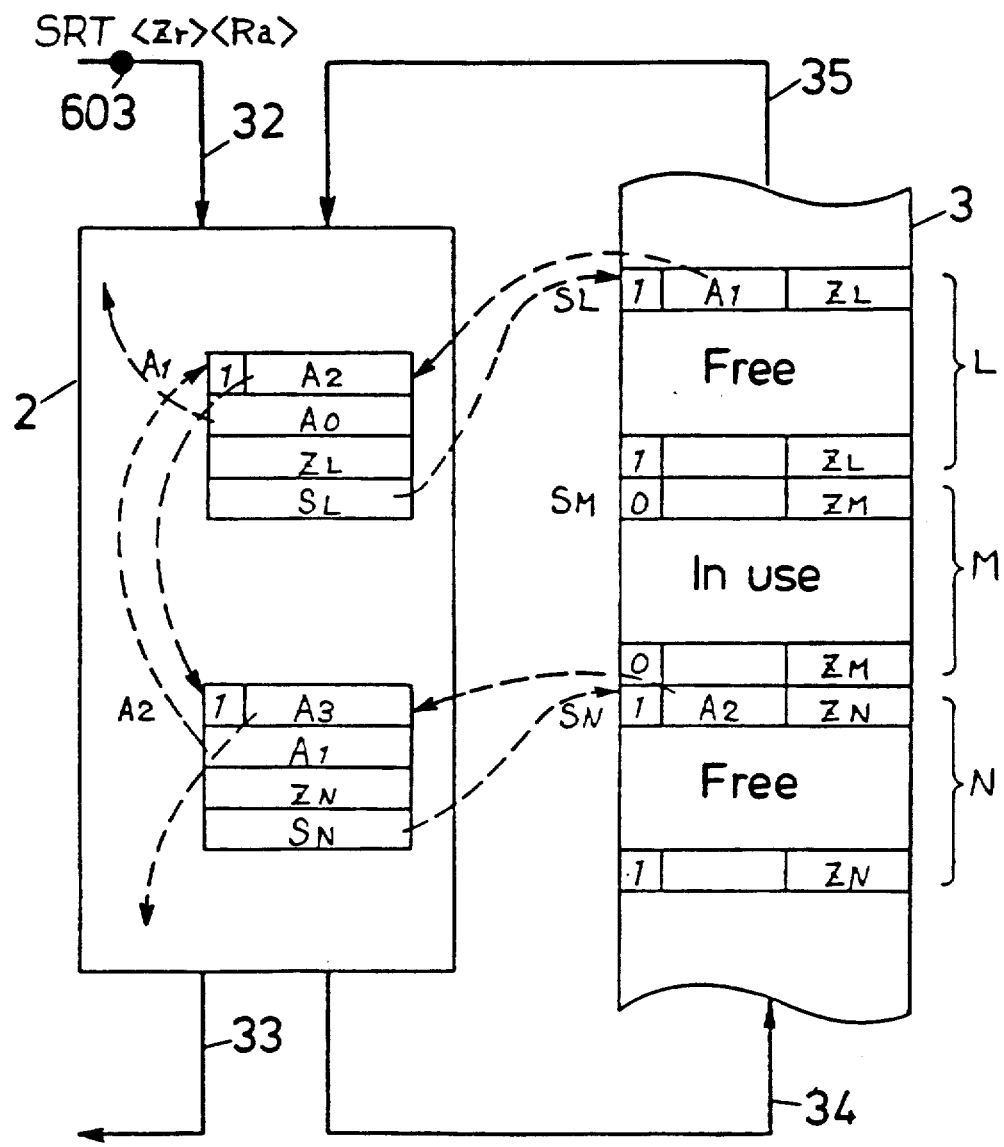
FIG. 8a illustrates an embodiment of the present upon receipt of an SRQ.
Figure 8B:
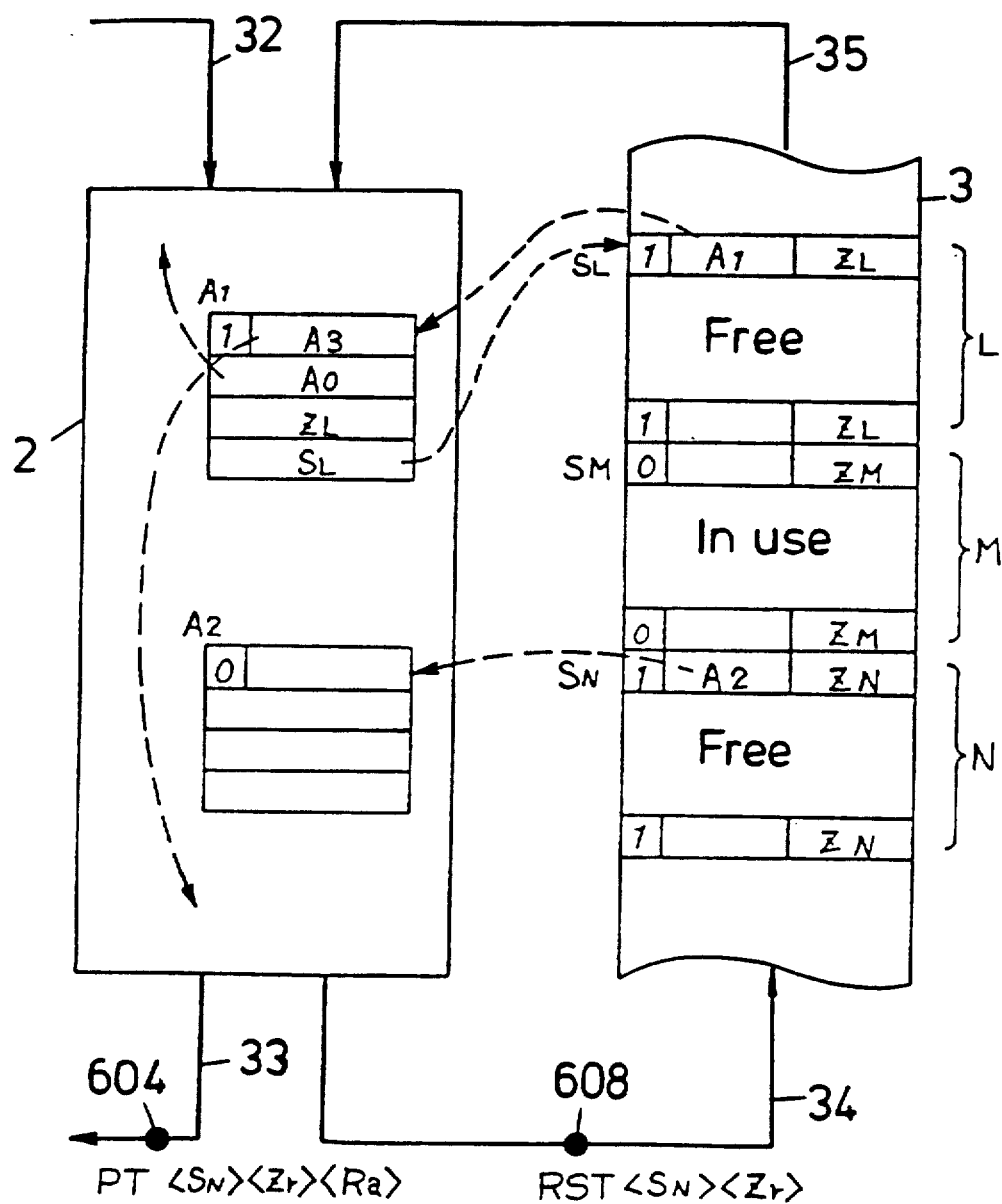
FIG. 8b illustrates the response to receipt of an SRQ.
Figure 8C:
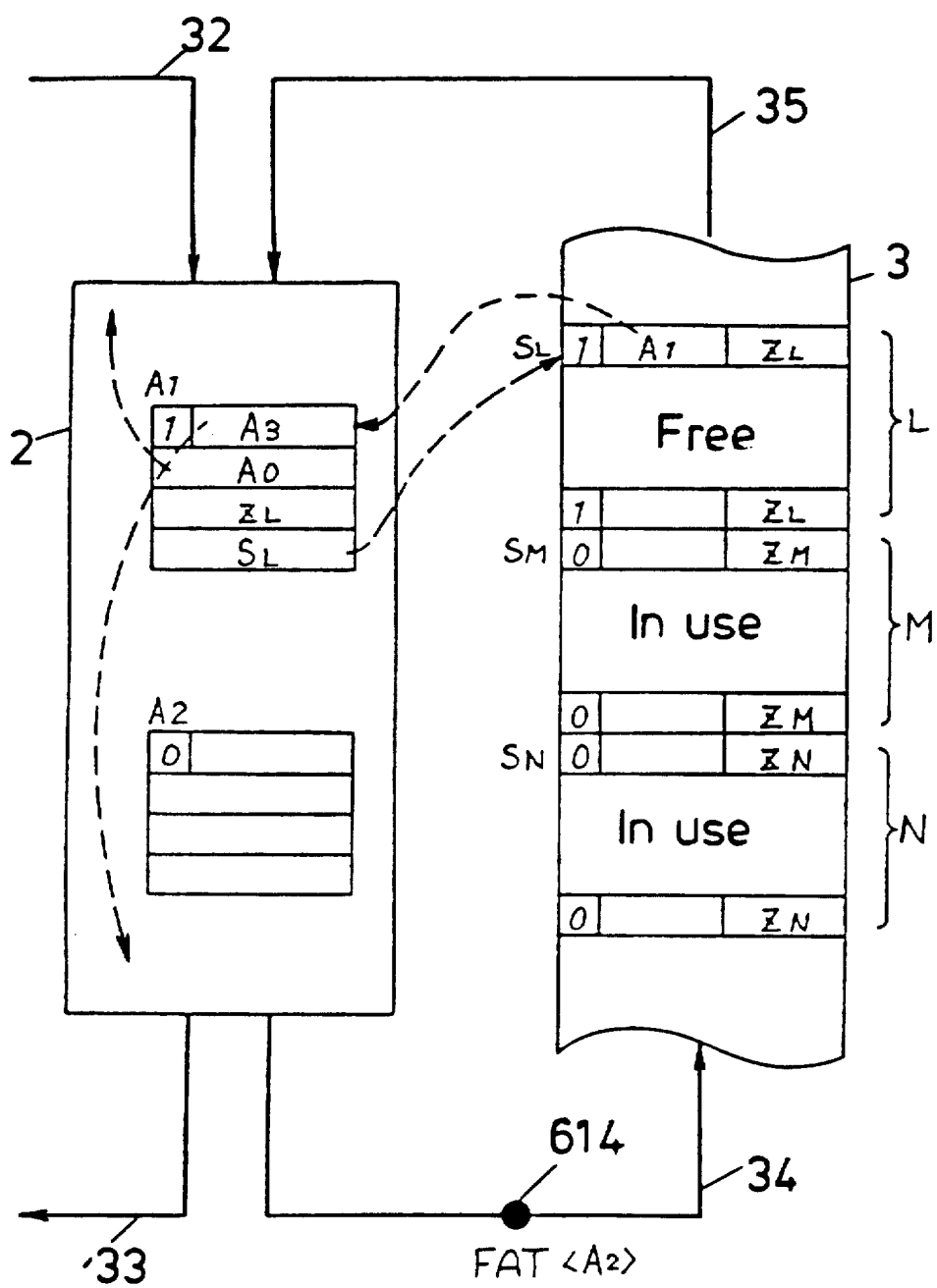
FIG. 8c illustrates the generation of an FDA.

(c) When the distribution section 2 has sent out a reserve space token 608, since the allocator A2 has become free, its address is sent to the memory section 3 as shown in FIG. 8c as a free allocator address token (FDA) 614.

(d) When the memory section 3 receives (FDA) token 614, it stores the free allocator address. When a memory space is no longer being used, the memory section 3 detects this and starts the process of making the content of the allocator series within the distribution section 2 and the indicated contents of the memory space conform to each other. This process will be described hereinbelow. Referring to FIG. 8c, when space M for example is no longer in use, this means that space M is now a free space.

(e) When memory 3 detects that the space M is no longer in use, it enters a "1" in the free flag of the first and last addresses of this space. Then, in order to determine whether or not the spaces neighboring the space M are free, it reads the addresses (SM−1) and (SM+ZM) which is equal to SN to determine their free flags. The result of this in the situation illustrated in FIG. 8d is that it is discovered that the space L is free.

Figure 8D:
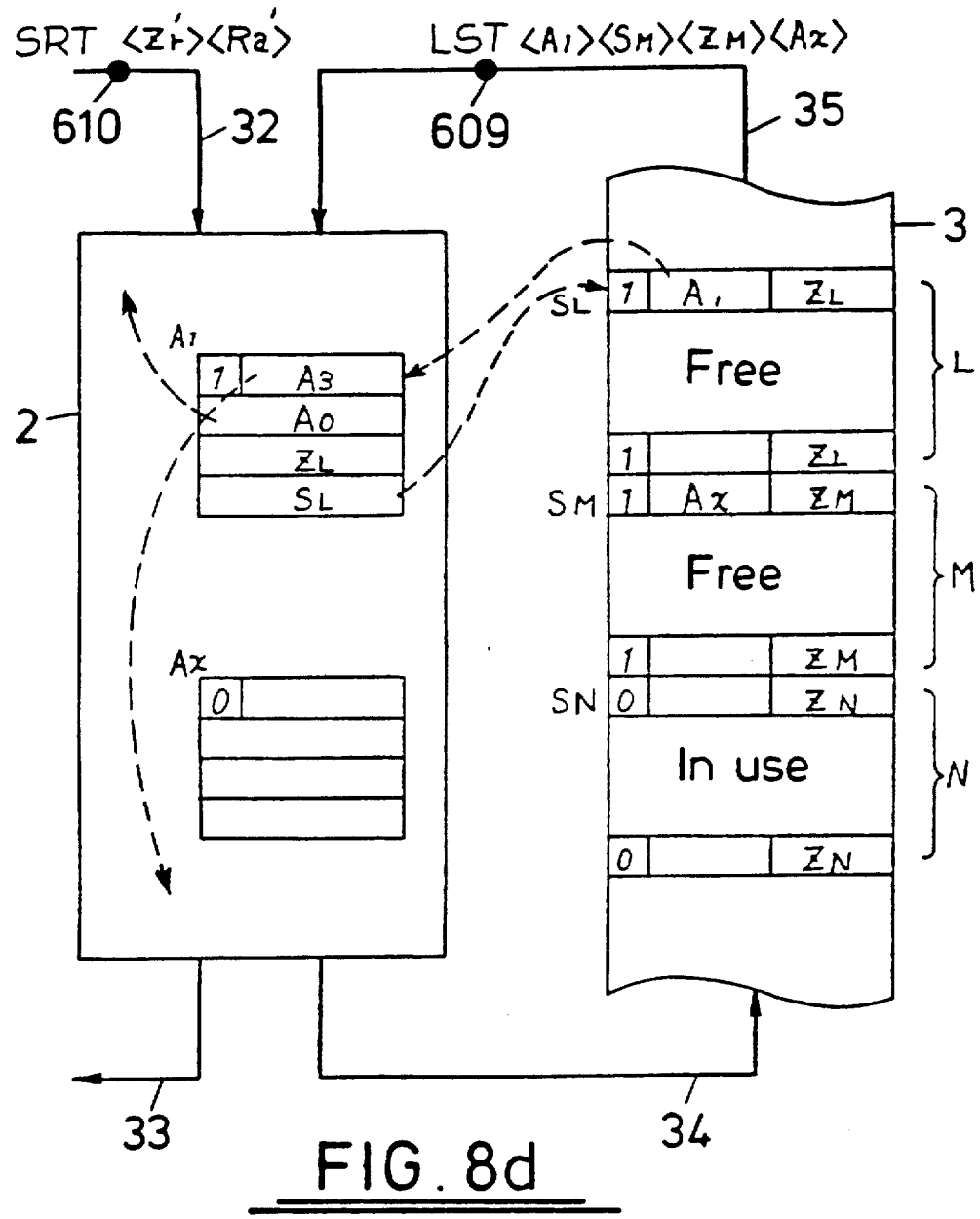
FIG. 8d illustrates the generation of an LIB and receipt of a further SRQ.
Figure 8E:
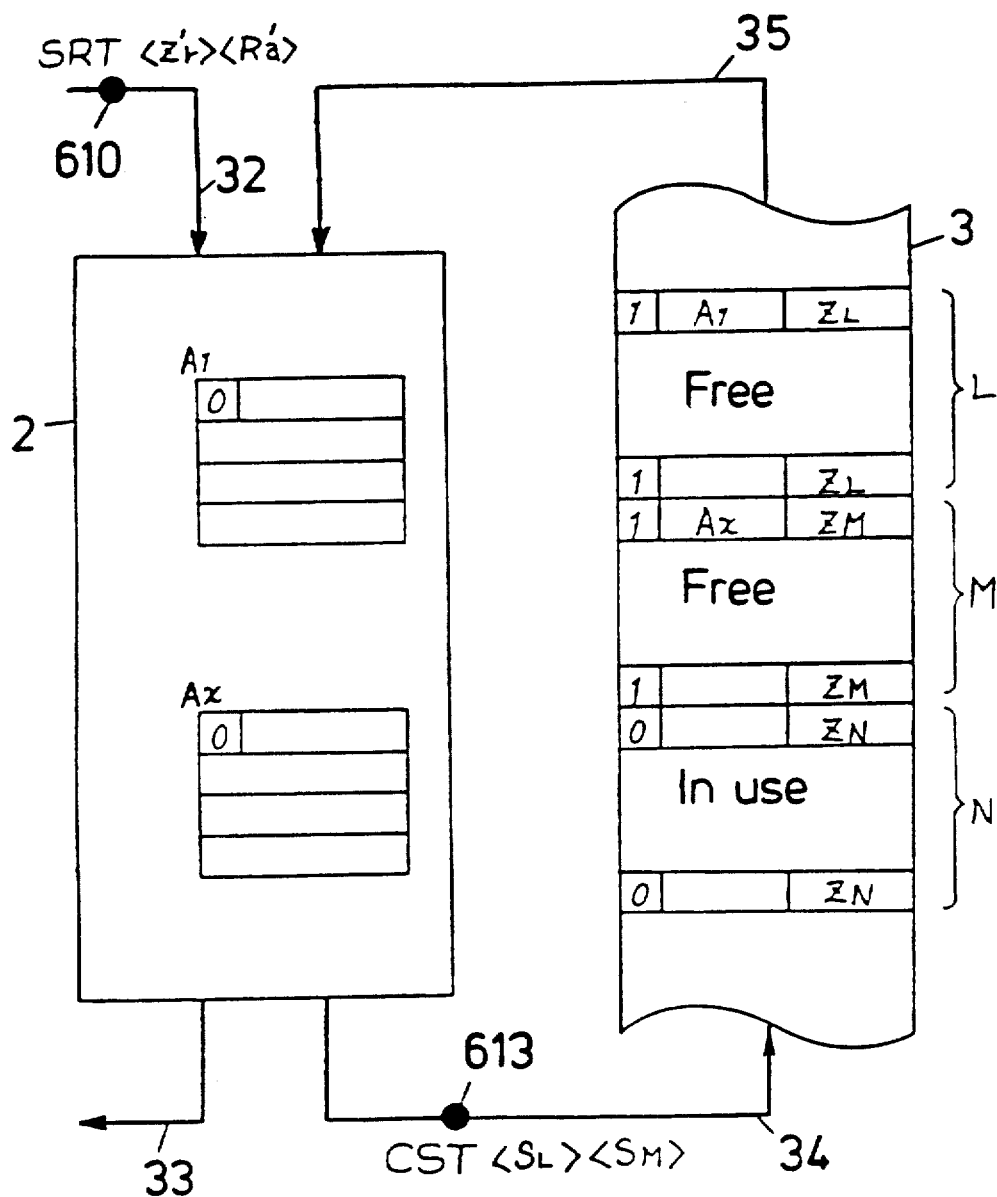
FIG. 8e illustrates the generation of a CMB before receipt of a further SRQ.

(f) Accordingly, in order to register M as a free space, the memory section 3 produces a liberate space token (LIB) 609 as shown in FIG. 8d. This LIB token has four parameters, namely:

(a) the address Al of the allocator corresponding to the free space L next to the space M;

(b) the address of the space M;

(c) the size of the space M;

(d) the address of allocator Ax corresponding to the space M. Just as in the explanation of the problems of the example shown in FIGS. 4a to 4h, the case in which a new space request token (SRQ) 610 has arrived from the processing device 103 is shown in FIG. 8d. In the case where token LIB 609 has arrived:

(g) When the liberate space token 609 is received, the distribution section 2 receives from this token the address A1 of the allocator which corresponds to the space L adjacent to space M. The distribution section 2 investigates the valid flag of the address A1. In FIG. 8d, this flag is "1" so the distribution section realizes that space L is free and the spaces L and M can be joined together. As shown in FIG. 8e it generates the combine space token (CMB) 613. The CMB token holds the start addresses of the two spaces to be joined together, SL and SM. "0" is then entered into the valid flag of the allocator A1.

Figure 8F:
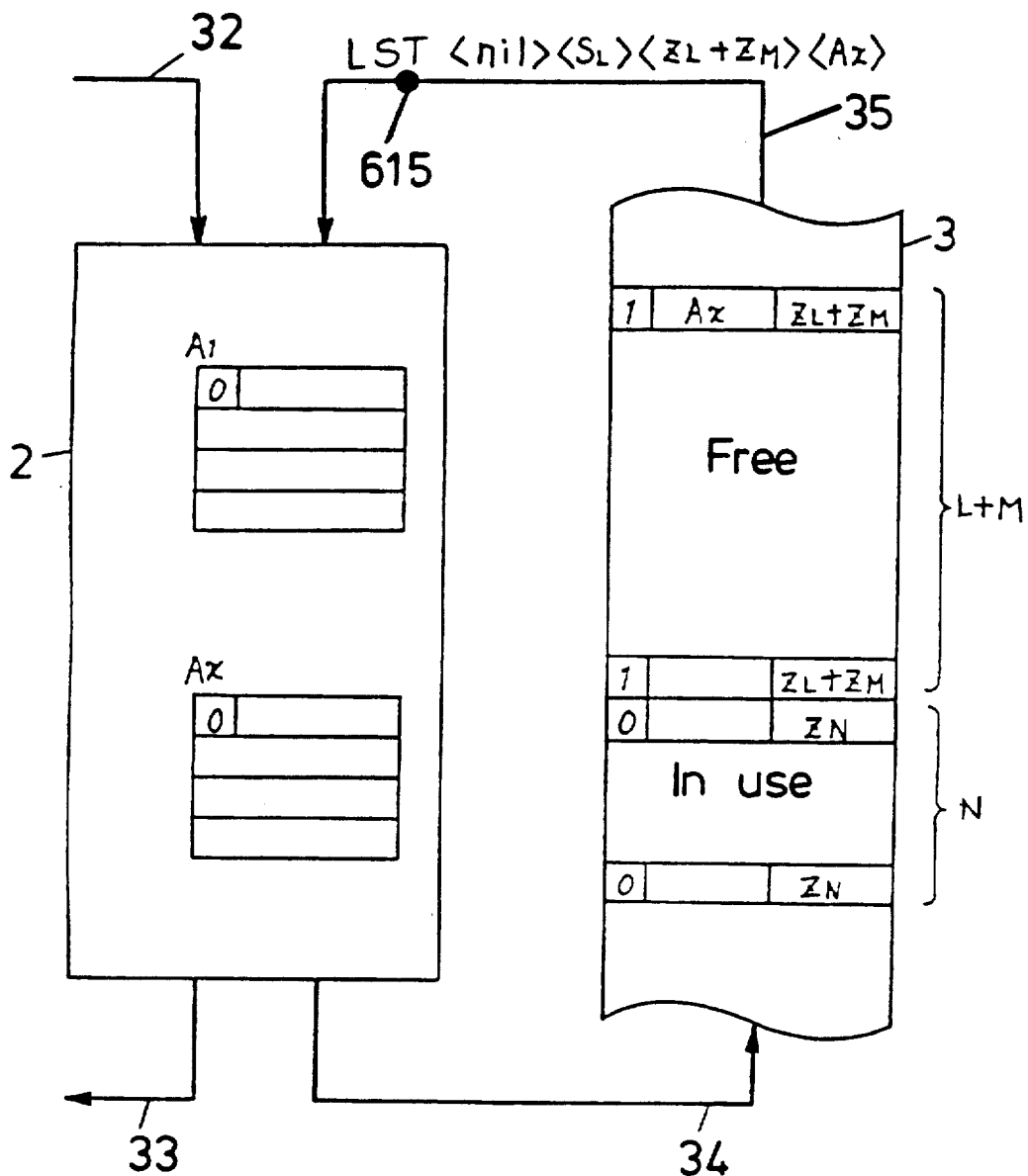
FIG. 8f illustrates the generation of a further LIB signal.

(h) When the memory 3 receives the combine space token 613, it calculates the start address of the space which is formed when the two spaces L and M are joined together, and its size, and as shown in FIG. 8f it enters the size (ZL plus ZM) into the start address SL. When the spaces L and M have been combined into a single free space this is detected by memory 3 which then repeats the process as described above starting at paragraph (e). In the case where there is no neighboring free space, referring to FIG. 8f, a "nil" kind of LIB token 615 is generated, indicating that there is no allocator address corresponding to a neighboring free space.

(i) When the distribution section 2 receives the liberate space token 615 of FIG. 8f, the allocator address Ax valid flag is "0", so the start address SL and the size (ZL + ZM) is entered into a free allocator Ax and this allocator is introduced into the allocator series. Assuming the above series of processes has been completed, then in the condition of FIG. 8d, the situation in which a space request token 610 arrives will be explained.

(j) When a space request token 610 arrives, the distribution section 2 scans the allocator series, and reserves for example space L. Accordingly as in FIG. 3g a pointer token 611 and a reserve space token 612 are generated. At the same time "0" is entered into the valid flag of the allocator Al which corresponds with the space L.

Figure 1B:
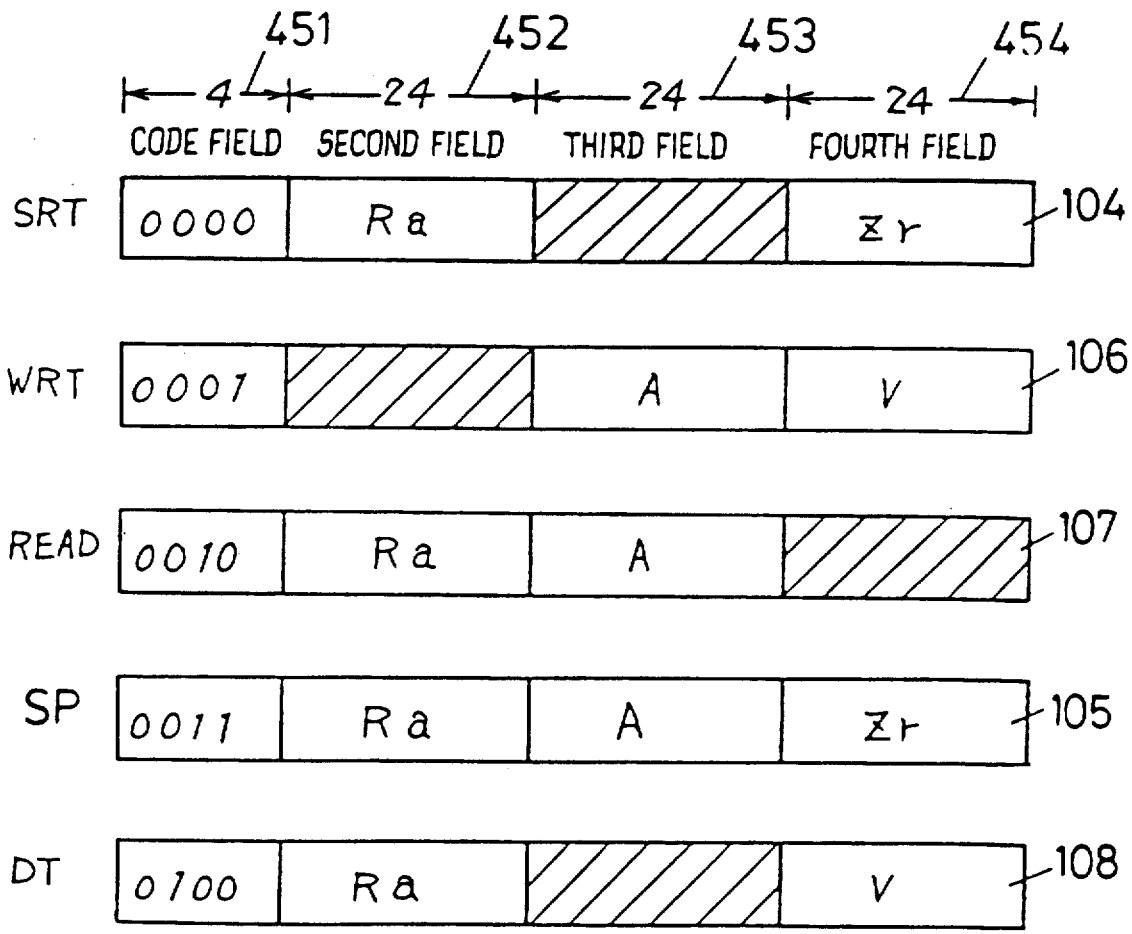
Figure 2A:
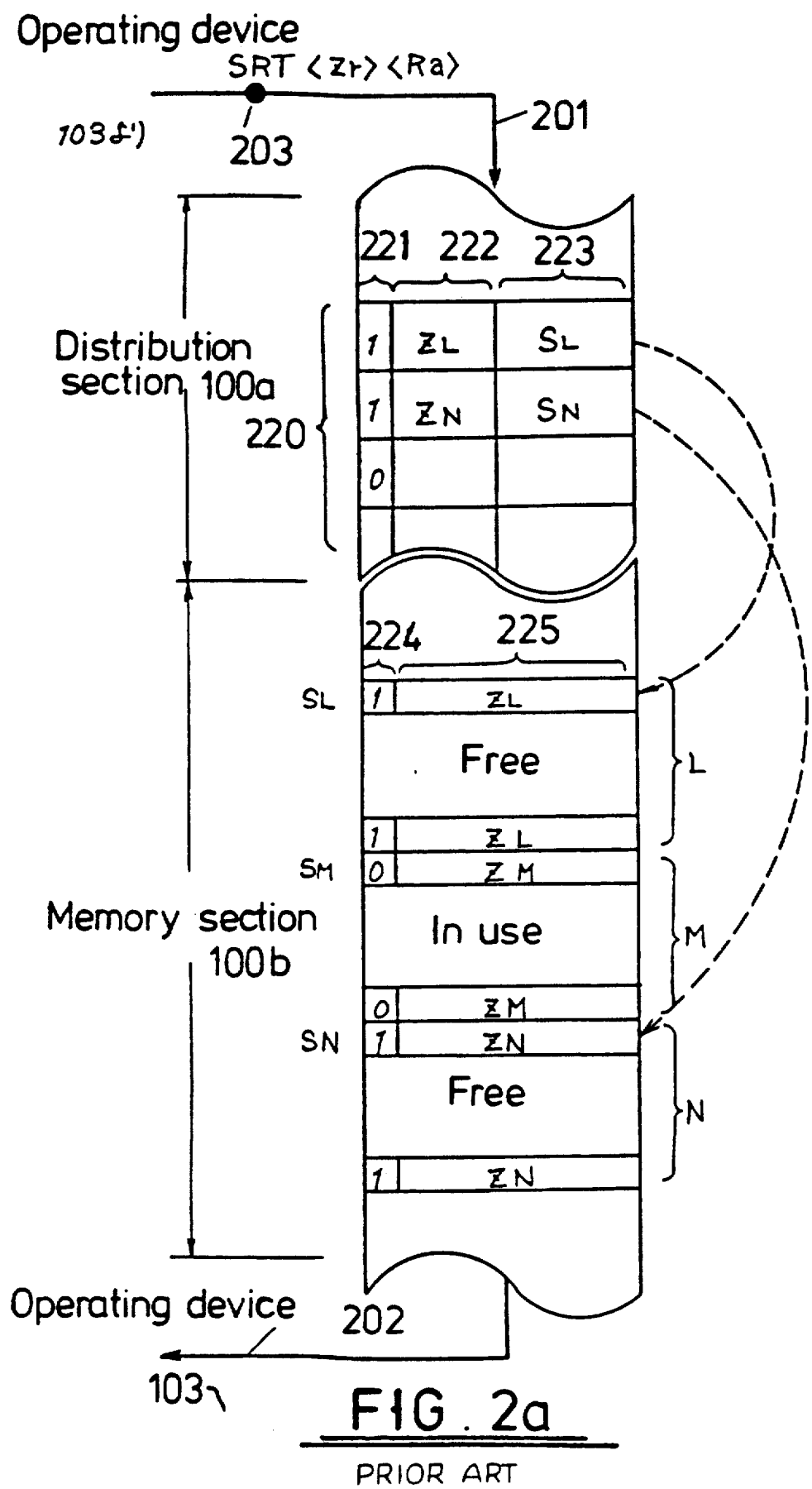
FIGS. 2a to 2c, FIG. 3, FIGS. 4a to 4h and FIG. 5 are schematic diagrams illustrating the prior art distribution process, FIGS. 2a, 2b and 2c respectively show receipt of an SRQ, generation of a PNT, and combination of two adjacent memory spaces.
Figure 2B:
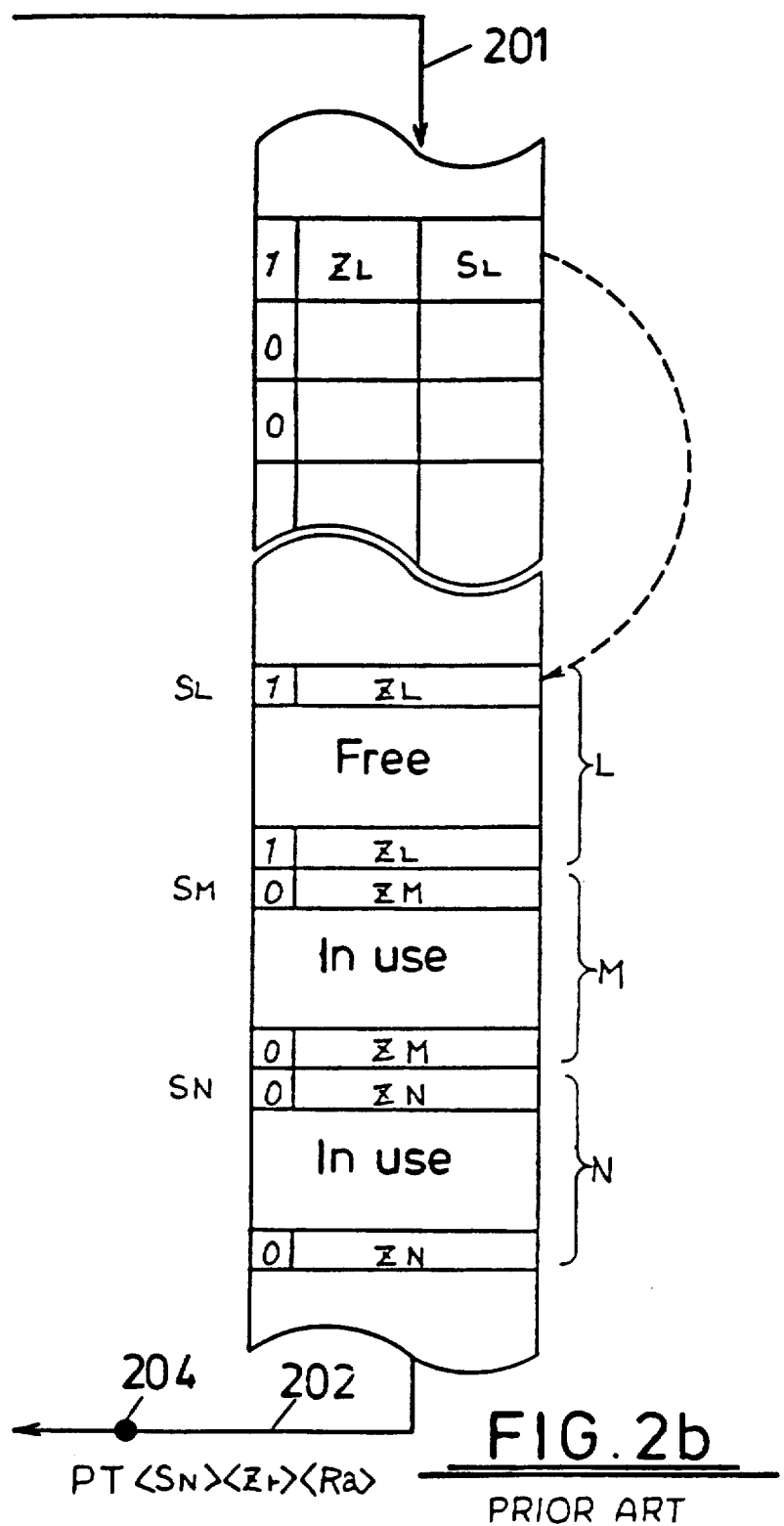
Figure 2C:
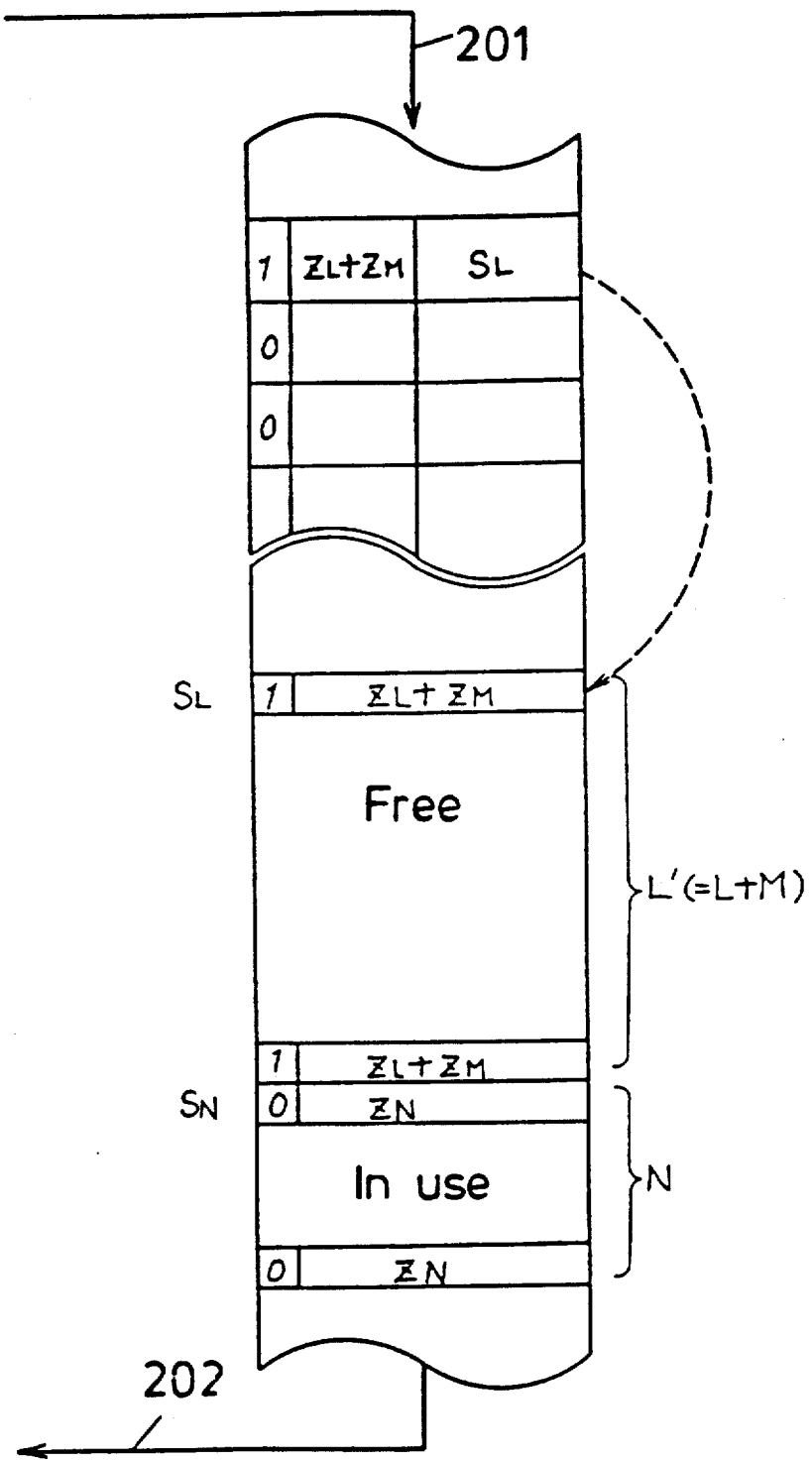
Figure 8G:
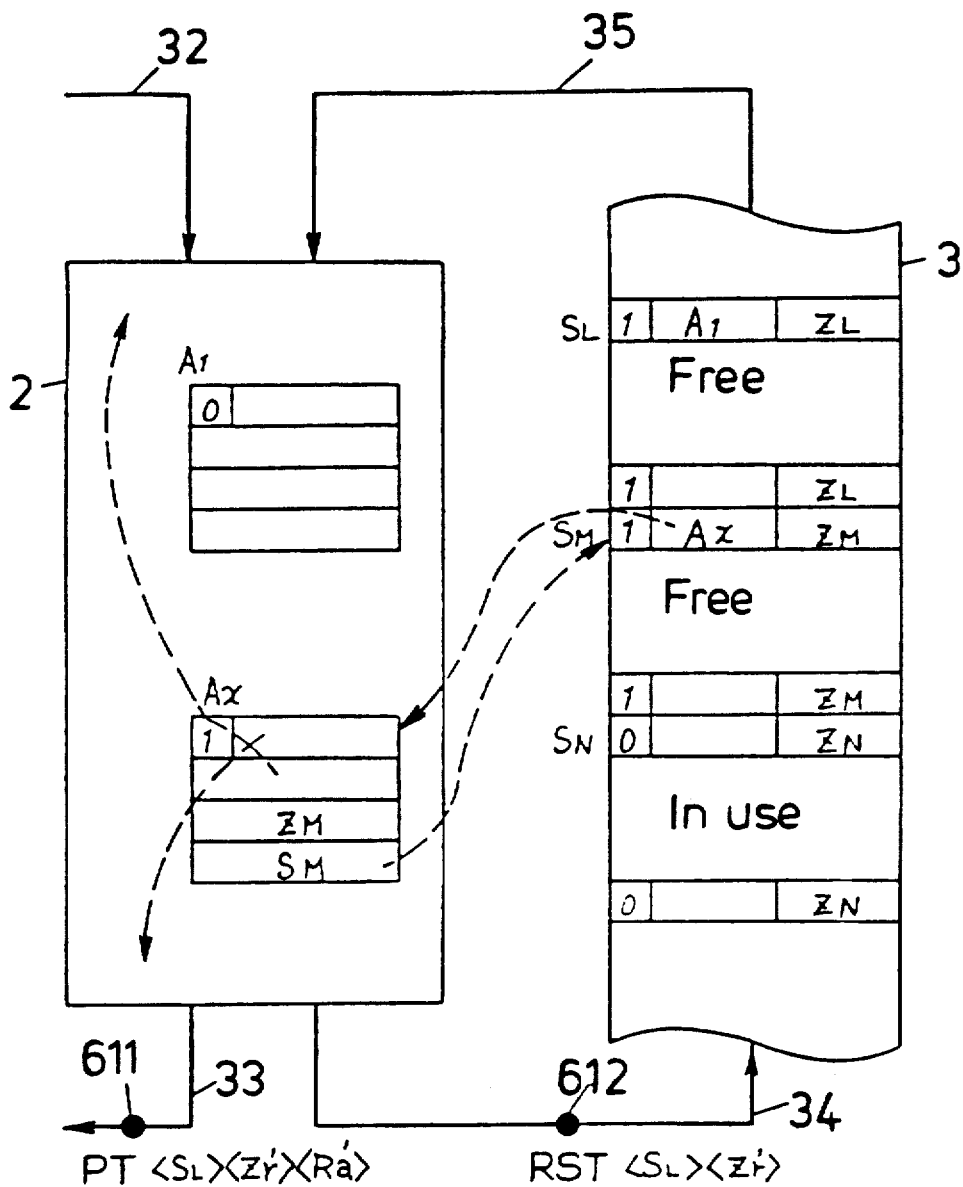
FIG. 8g illustrates the generation of RSV signals in response to receipt of the further SRA signal.
Figure 8H:
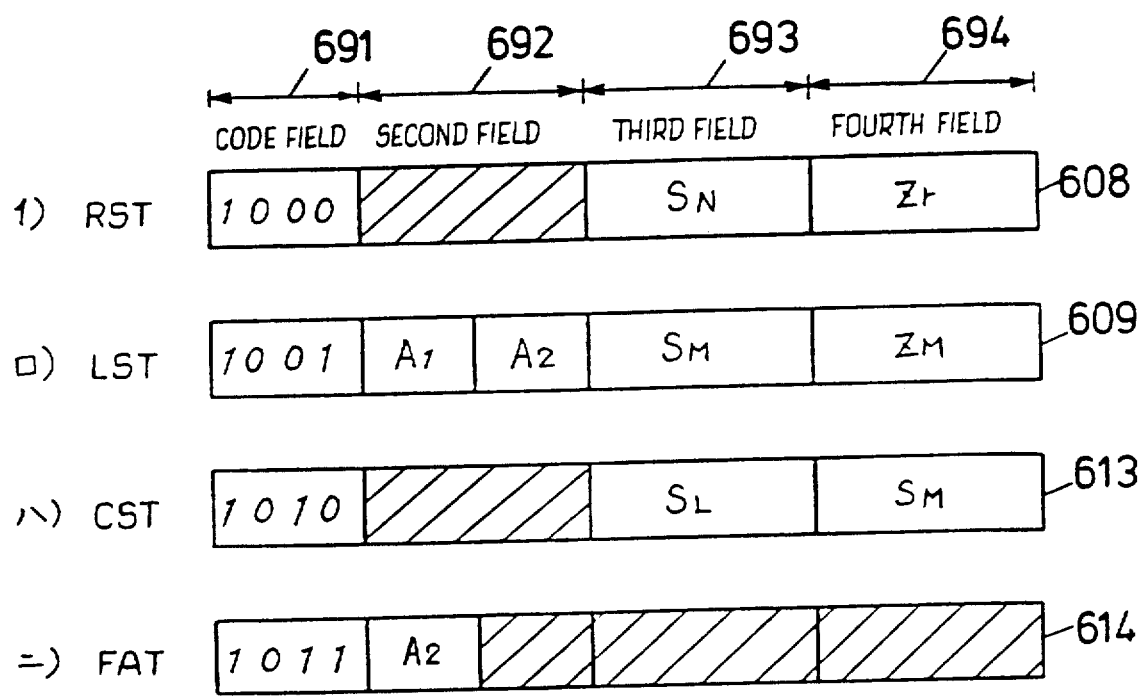
FIG. 8h illustrates the token structure.

(k) When the distribution section 2 receives the liberate space token 609, it takes the parameter A1 from the token and checks the valid flag of the address A1. This flag has become "0", and the distribution section 2 realizes that it cannot join the spaces together. Thus the start address SM and size ZM of the space M are entered into the free allocator address Ax which is held in the LIB token 609. Each of the flags is made "1", and the allocator Ax is entered into the allocator series. The result is as shown in FIG. 8g. The form of each of the tokens RSV 608, LIB 609, CMB 613 and FDA 614 which are in FIGS. 8b, c, d and e, are shown in FIG. 8h. In these figures numerals 691 to 694 correspond to the fields 151 to 154 in FIG. 1b respectively. It is clear from FIG. 8h, that LIB token 609 has four parameters, and is different from the LIB token in FIG. 4h. Even though the distribution section 2 has received the liberate space token (LIB) 609, in fact space combining cannot take place on the occasions when the new allocators are changed into a series as follows:

(a) as mentioned in (k) above, the allocator which is indicated by the LIB token 609 is not in an allocator series;

(b) the LIB token 609 is holding "0" as an allocator identification.

Spaces are combined only when it has been confirmed that the spaces in both the memory section and the distribution section 2 can be combined. This means that even when the memory section and the distributor section 2 are separated it is possible to correctly allot and join free spaces. Furthermore, because the LIB token 609 holds an allocator address as a parameter, the distribution section 2 does not need to follow the allocator series and it is possible to determine quickly whether or not the spaces can be joined together. The present invention is an improvement even in systems where there are several distribution sections.

FIGS. 9a to 9e show an example of a system in which there are several distribution sections 2A and 2B.

Figure 9A:
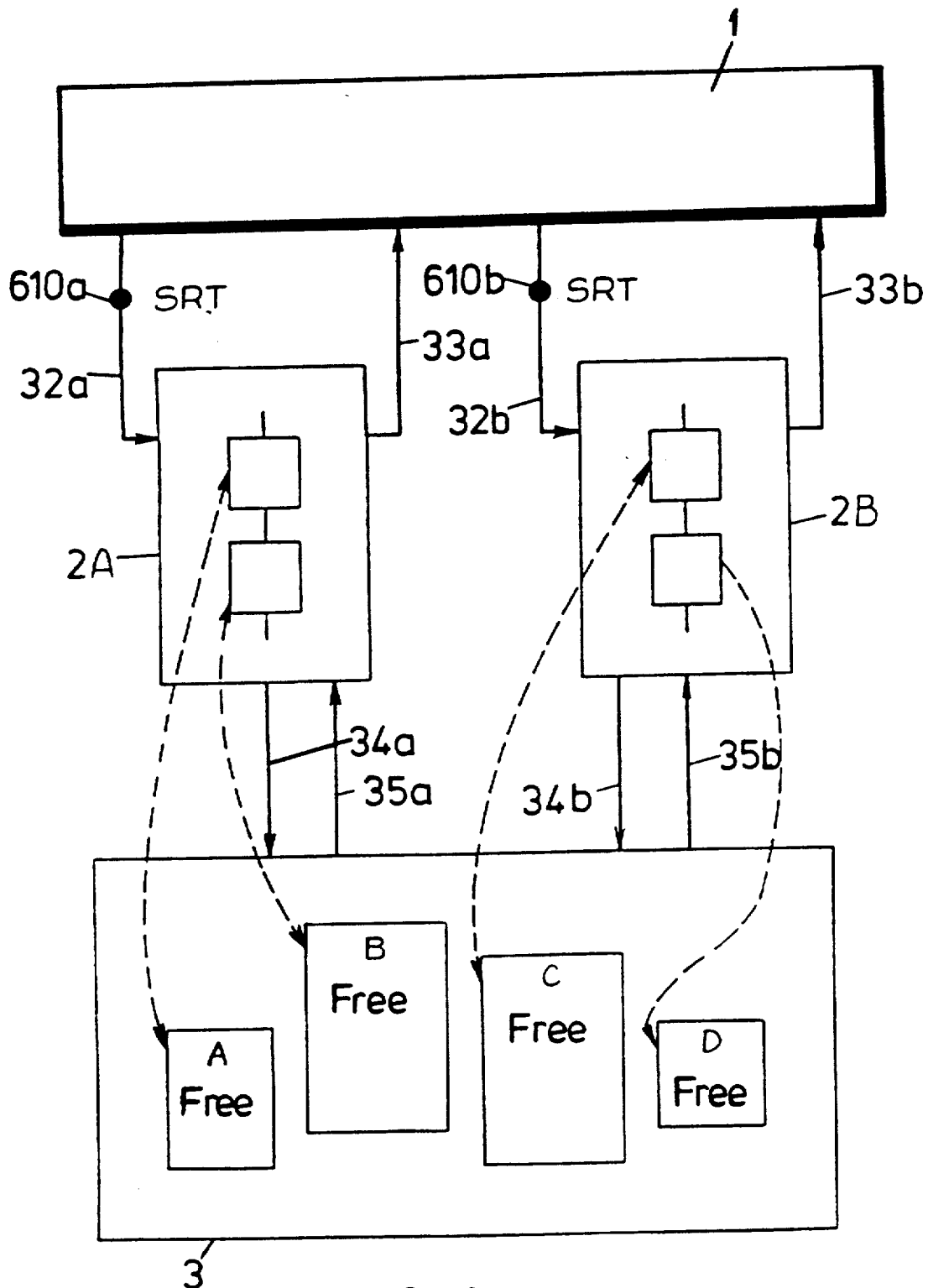
FIG. 9a illustrates a system incorporating more than one distribution section.
Figure 9B:
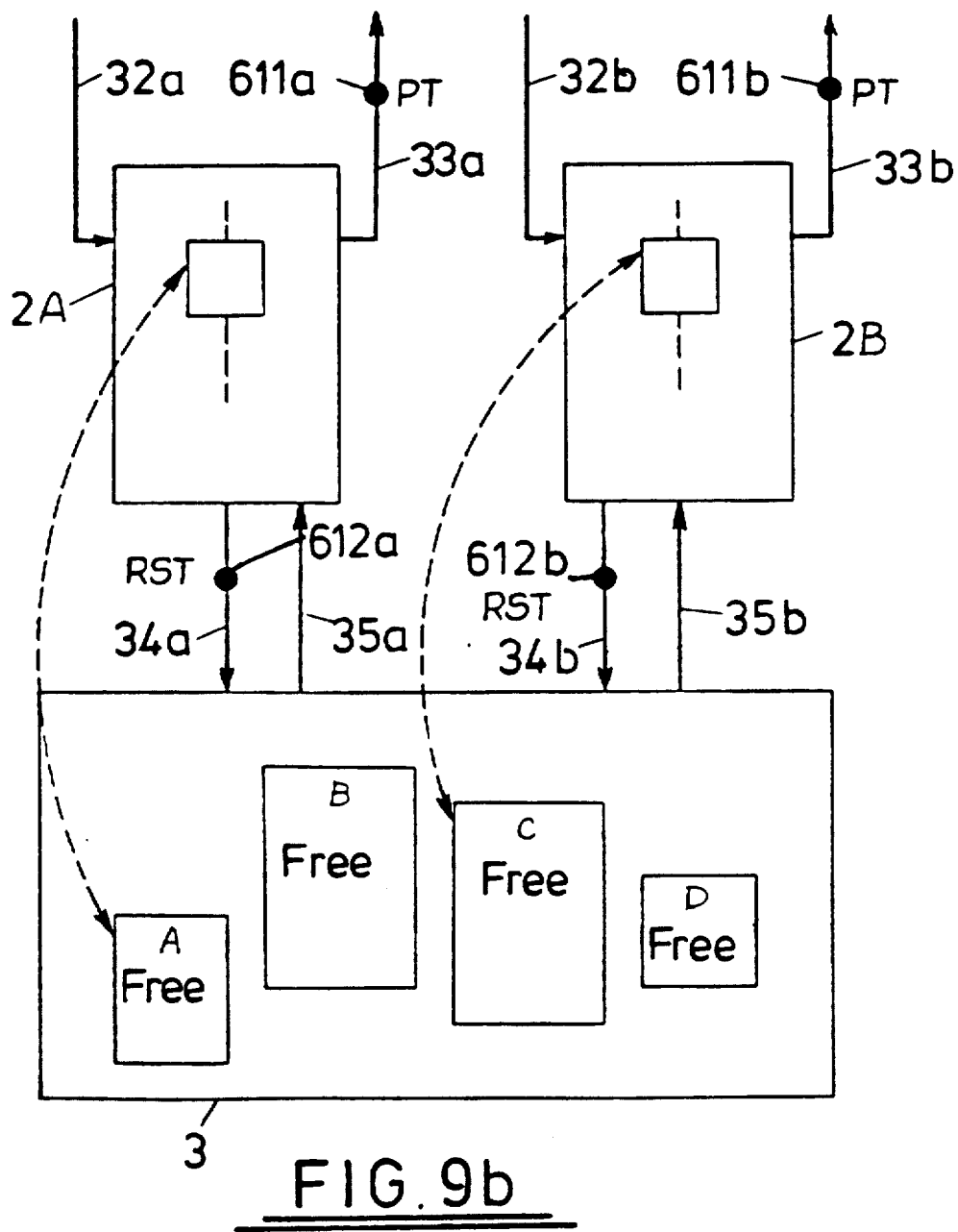
FIG. 9b illustrates the generation of independent pointer tokens.

Referring to FIG. 9a, the distribution sections 2A and 2B receive independently from the processing device 1 space request tokens 610a and 610b, and as shown in FIG. 9b independently give rise to pointer tokens 611a and 611b and space request tokens 612a and 612b. The operation of this can lead to contradictions and it is clear that conflict must not arise.

Next follows an explanation of how conflict can result from combining spaces together in the situation where the use of a space has finished.

Figure 9C:
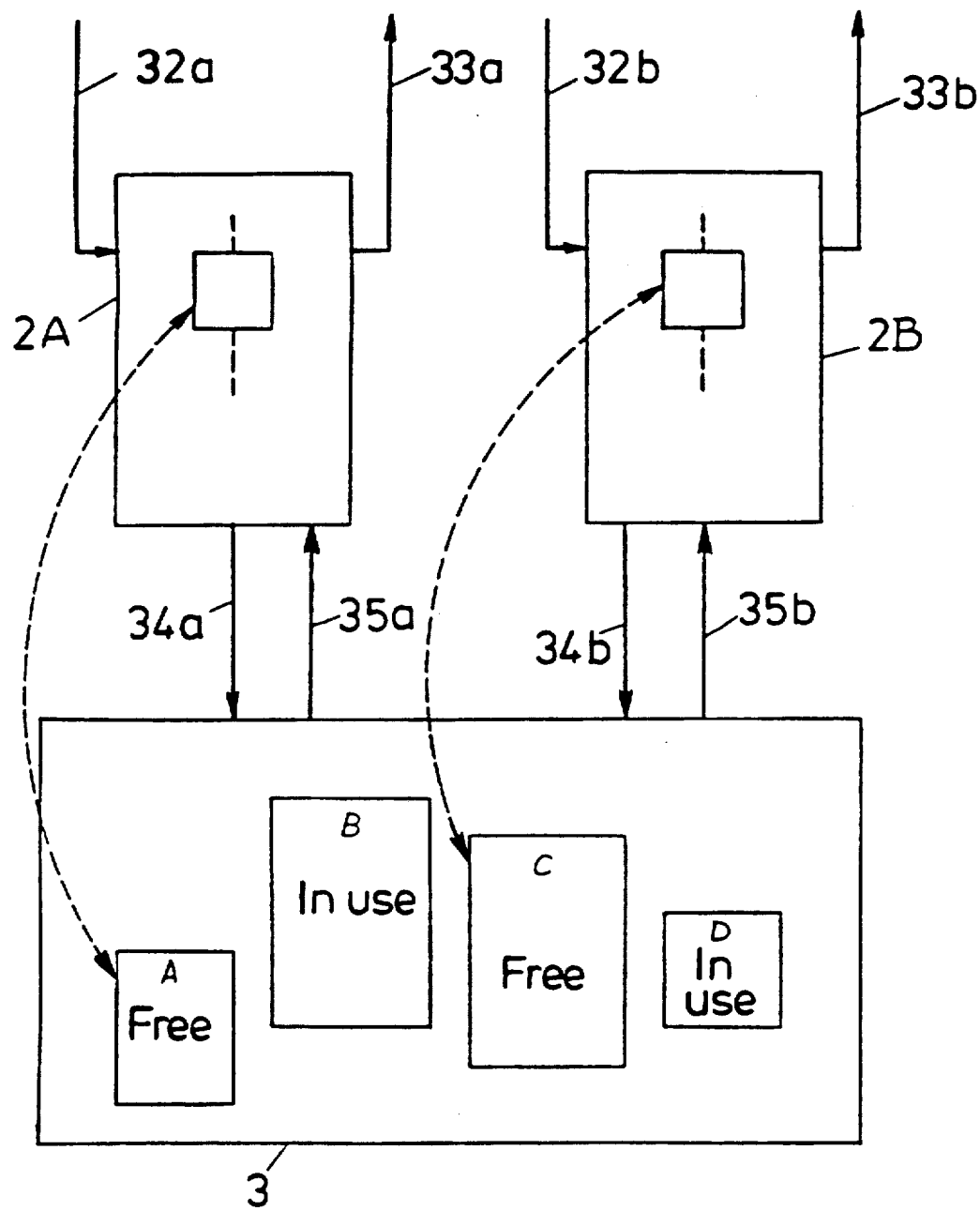
FIG. 9c illustrates conditions immediately before a space becomes available for use.
Figure 9D:
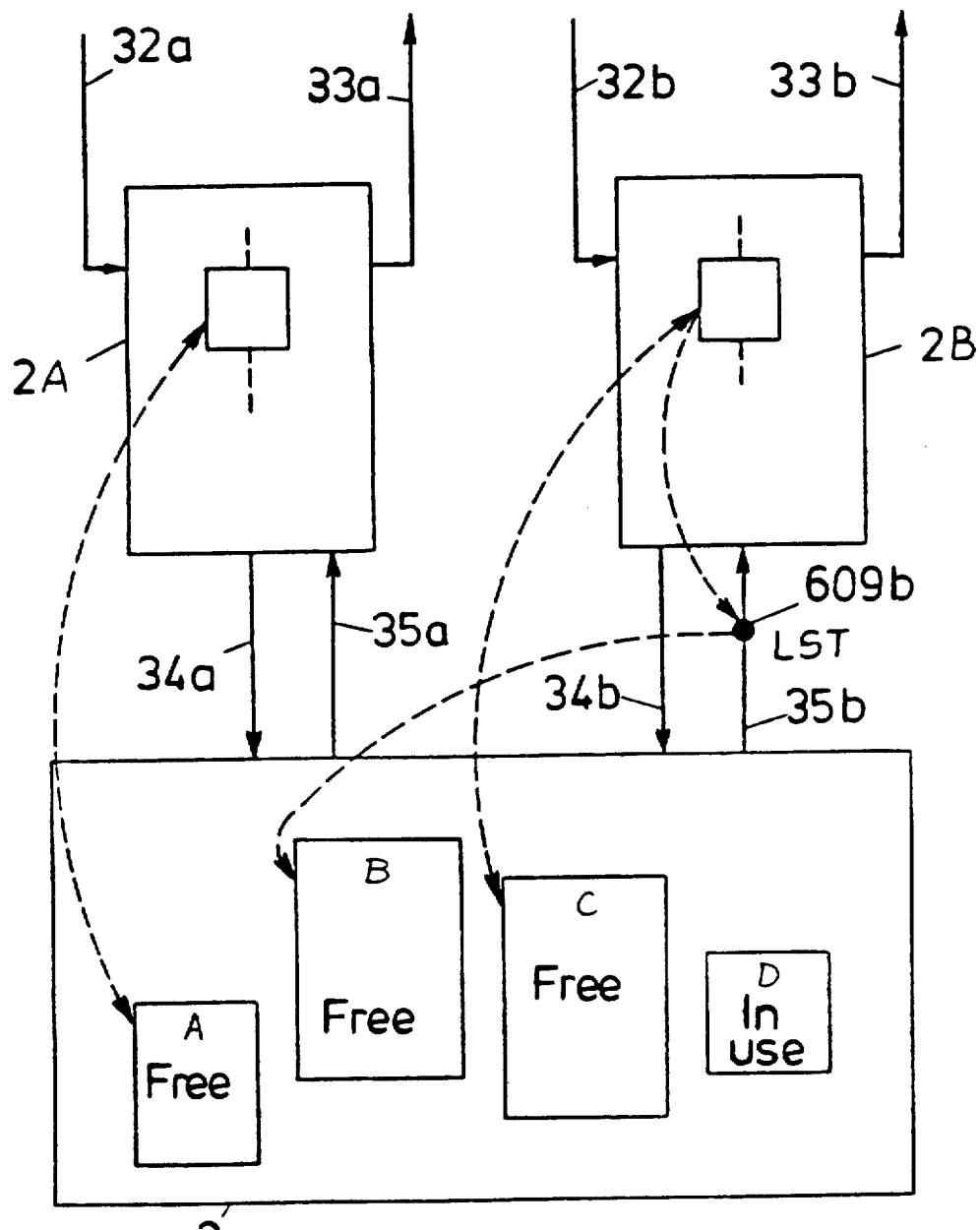
FIG. 9d illustrates the generation of an LIB token.
Figure 9E:
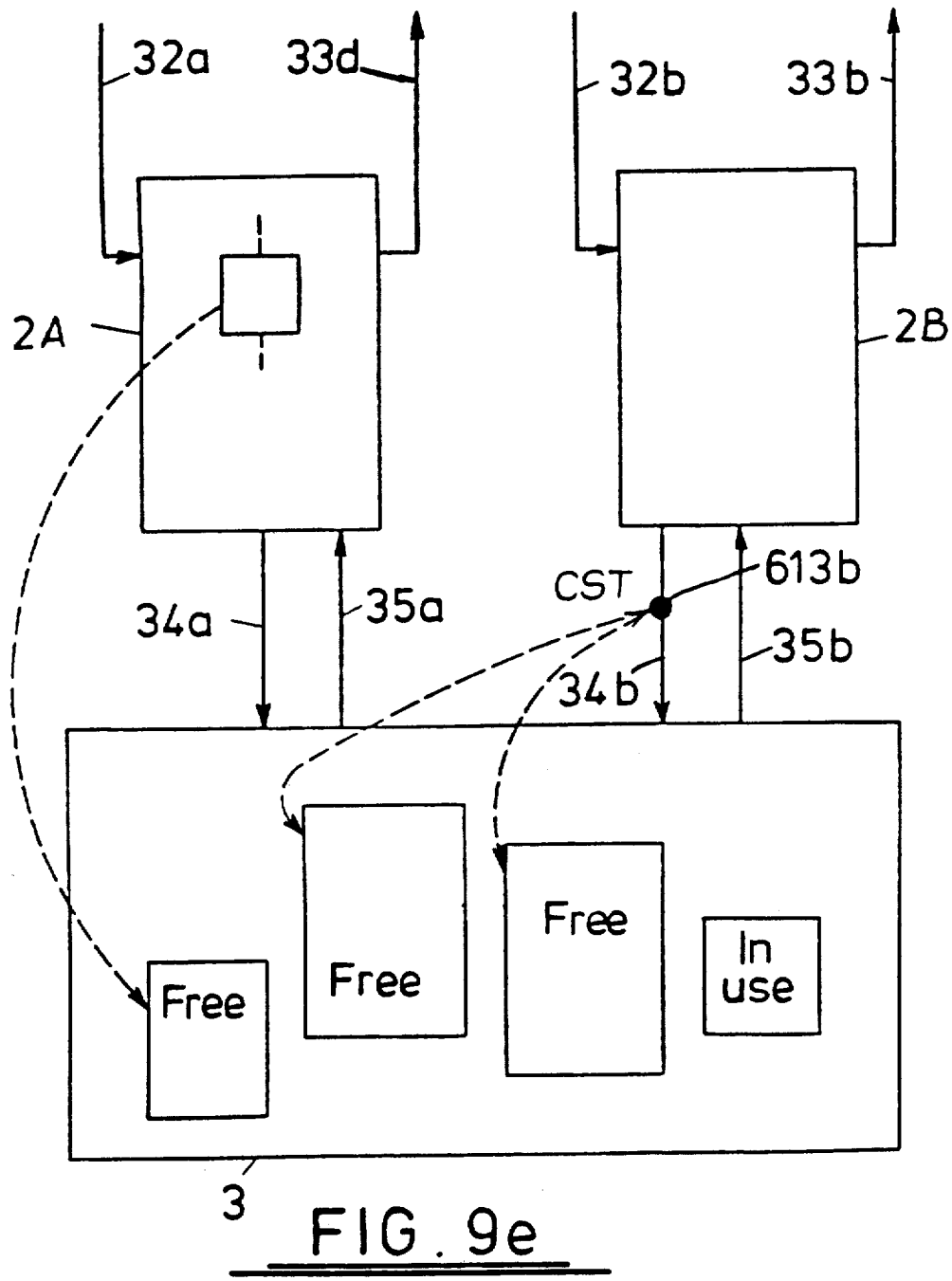
FIG. 9e illustrates the generation of a CMB token.

Each free space can be registered in different distribution sections. FIGS. 9c to 9e are intended to illustrate an example of the situation in which a space B is no longer in use.

Considering the space C which is adjacent to space B, at the time that the memory section 3 detects that the space B is no longer in use, referring to FIG. 9d, a liberate space token 609b is sent to a distribution section 2B which holds an allocator corresponding to the space C. In this case the allocator pointer indicates the start of the free space and includes information to distinguish the distribution section 2A or 2B. From this, it is possible to decide the correct destination for the liberate space release token 609b, and it is not necessary as it was in the previous examples to investigate the information in all, the memory 3.

The distribution section 2B operates in exactly the same way as is described in (i) above, and sends the combine space token (CMB) to the memory section 3. The memory section 2 carries out the combining of the spaces just as described above. The workings of the situation in which a LIB token 615 indicates an allocator is not in the distribution section 2 takes place as described above in (k) and contradictions do not occur.

Furthermore in the above-mentioned explanation consideration is given to the combining of a space which is no longer in use and an adjacent free space. However it is not necessary to consider combining only "neighbouring" spaces. For example, if there is a kind of relationship such as makes it possible to carry out the same process with the resulting space from the combination of two separated spaces, it is clear that the method of the present invention can be applied. A kind of separation and combining algorithm can be considered. "K.C. Nult "A Fast Storage Allocator" (CACM Volume 8 No. 10, Oct. 1965 pp 623 to 625)" describes an algorithm which divides and combines memory space in sizes that are powers of 2.

As mentioned above, the present invention uses allocators each of which corresponds to a free space in the memory device, each free space includes a pointer to the respective allocator, and each allocator includes a pointer to the respective free space (for example the start address) and any other desired information relating to the free space, for example its size. When a memory space becomes free, the memory device investigates whether or not that space can be combined with another free space.

We claim:

1. A method for controlling the use of space in a data storage system in which a processing device communicates with a distribution section and the distribution section manages the allocation of space in a memory section in response to communications with the processing device, comprising:
   a. storing available allocator addresses in the memory section, each available allocator address identifying a respective portion of a memory of the distribution section which is available to store allocator data,
   b. storing in the memory section, for each free space within the memory, data identifying the length of the free space selecting an allocator address from the available allocator addresses stored in the memory section,
   c. storing the allocator address selected from the available allocator addresses in the memory section for each free space,
   d. storing allocator data in the portions of the distribution section identified by the selected allocator addresses, each portion storing a pointer to the free space for which the allocator address of that portion is stored and each portion storing length data identifying the length of the free space for which the allocator address of the portion is stored,
   e. identifying any space within the memory section which becomes available for use.
   f. identifying any space within the memory section which can be combined with the space which becomes available,
   g. transmitting a liberate space token from the memory section to the distribution section for each space which becomes available, the liberate space token including as a first allocator address an address selected from the available allocator addresses stored in the memory section, and as a second allocator address the address stored in the memory section for any one of the space which can be combined.
   h storing a first allocator at the first address in the event that no such second address is included in the liberate space token, the stored allocator pointing to the space which becomes available to indicate that that space is free,
   i. combining the space which becomes available and the space which can be combined therewith in the event that the second address is included in the liberate space token, and the second allocator address points to a free space in the memory section, the spaces being combined to form a single free space, and storing a second allocator at the first address which allocator points to the single free space and includes length data identifying the length of the combined space, and
   j. storing a third allocator at the first address in the event that the second address is included in the liberate space token, and the second allocator address does not point to a free space in the memory section, the allocator being stored at the first address and pointing to the space within the memory section which becomes available to indicate that that space is free,
   whereby the liberate space token carries with it sufficient information to be able to recognize, from the status of the allocators, whether or not it is appropriate to combine free spaces.

2. A method according to claim 1, comprising:
   selecting allocator data identifying a free space of sufficient length in response to a request from the processing device for a predetermined length of free space in the memory section,
   flagging the address of the selected allocator data as no longer pointing to a free space in the memory section,
   transmitting to the memory section a reserve space token identifying the free space of sufficient length and a free allocator token identifying the flagged allocator address,
   flagging the free space of sufficient length as no longer being free, and
   storing the flagged allocator address as an available allocator address.

3. A method according to claim 1, comprising:
   flagging the second allocator address as no longer pointing to a free space in response to receipt of a liberate space token including the second address and in the event that the second allocator address points to a free space in the memory section,
   transmitting a combine space token to the memory section, the combine space token identifying the free spaces to be combined,
   transmitting a liberate space token from the memory section to the distribution section in response to receipt of the combine space token, the liberate space token including data identifying the length of the combined space and the first allocator address, and
   storing the data identifying the length of the combined spaces at the first allocator address in the distribution section.

4. A method according to claim 1, comprising combining spaces having consecutive series of addresses in the memory section.

5. An apparatus for controlling the use of space in a data storage system in which a processing device communicates with a distribution section and the distribution section manages the allocation of space in a memory section in response to communications with the processing device, comprising:
   a. means for storing available allocator addresses in the memory section, each available allocator address identifying a respective portion of a memory of the distribution section which is available to store allocator data, b. means for storing in the memory section, for each free space within the memory, data identifying the length of the free space, means for selecting an allocator address from the available allocator addresses stored in the memory section,
c. means for storing the allocator address selected from the available allocator addresses in the memory section for each the free space,
d. means for storing allocator data in the portions of the distribution section identified by the selected allocator addresses, each the portion storing a pointer to the free space for which the allocator address of the portion is stored and each the portion storing length data identifying the length of the free space for which the allocator address of that portion is stored,
e. means for identifying any space within the memory section which becomes available for use,
f. means for identifying any space within the memory section which can be combined with the space which becomes available,
g. means for transmitting a liberate space token from the memory section to the distribution section for each space which becomes available, the liberate space token including as a first allocator address an address selected from the available allocator addresses stored in the memory section, and as a second allocator address the address stored in the memory section for any one of the space which can be combined,
h. means for storing a first allocator at the first address in the event that no such second address in included in the liberate space token, the stored allocator pointing to the space which becomes available to indicate that that space is free,
i. means for combining the space which becomes available and the space which can be combined therewith in the event that the second address is included in the liberate space token, and the second allocator address points to a free space in the memory section, the spaces being combined to form a single free space, and means for storing a second allocator at the first address which allocator points to the single free space and includes length data identifying the length of the combined space, and
j. means for storing a third allocator at the first address in the event that the second address is included in the liberate space token, and the second allocator address does not point to a free space in the memory section, the allocator being stored at the first address and pointing to the space within the memory section which becomes available to indicate that that space is free.

whereby the liberate space token carries with it sufficient information to be able to recognize, from the status of the allocators, whether or not it is appropriate to combine free spaces.

* * * * *